(12) United States Patent
Nordstrom et al.

(10) Patent No.: US 10,465,657 B2
(45) Date of Patent: Nov. 5, 2019

(54) METHODS AND SYSTEMS FOR CONTROLLING MOTION OF FLOATING GROUND STATION

(71) Applicant: Makani Technologies LLC, Alameda, CA (US)

(72) Inventors: Charles Nordstrom, Berkeley, CA (US); Joel Fraser Atwater, Danville, CA (US); Douglas Mcleod, Oakland, CA (US)

(73) Assignee: Makani Technologies LLC, Alameda, CA (US)

( * ) Notice: Subject to any disclaimer, the term of this patent is extended or adjusted under 35 U.S.C. 154(b) by 137 days.

(21) Appl. No.: 15/834,295

(22) Filed: Dec. 7, 2017

(65) Prior Publication Data

US 2019/0178228 A1 Jun. 13, 2019

(51) Int. Cl.
*F03D 7/02* (2006.01)
*F03D 9/32* (2016.01)
(Continued)

(52) U.S. Cl.
CPC .......... *F03D 7/0296* (2013.01); *B64C 39/022* (2013.01); *B64F 3/00* (2013.01);
(Continued)

(58) Field of Classification Search
CPC .......... F03D 7/0296; F03D 13/25; F03D 9/32; B64F 3/00; B64C 39/022; F05B 2240/923; F05B 2240/95; F05B 2240/93; F05B 2270/404; B63B 2035/446; B63B 35/44; B63J 2099/006
See application file for complete search history.

(56) References Cited

U.S. PATENT DOCUMENTS 6,138,598 A * 10/2000 Askestad ............... B63H 25/00
114/230.12
9,126,675 B2 * 9/2015 Chubb .................. B64C 39/022
(Continued)

FOREIGN PATENT DOCUMENTS

WO 2017/116643 7/2017

OTHER PUBLICATIONS

International Searching Authoring, International Search Report and Written Opinion dated Apr. 1, 2019, issued in connection with International Patent Application No. PCT/US2018/064023, filed on Dec. 5, 2018, 17 pages.

*Primary Examiner* — Michael J Zanelli
(74) *Attorney, Agent, or Firm* — McDonnell Boehnen Hulbert & Berghoff LLP

(57) ABSTRACT

System and methods for controlling the oscillation of floating ground stations in aerial wind turbine systems are disclosed. Thrusters on the ground station or on one or more aerial vehicles associated with the ground station apply a compensatory force to the oscillating ground station to reduce and/or substantially eliminate wave-induced oscillations. Submerged thrusters may also rotate the ground station to a preferred alignment direction with the waves. Additionally, control systems use environmental and/or positional sensor data to develop a predictive force profile that maps desired compensatory force magnitude versus time. The control systems use that predictive force profile to direct the thrusters to apply a varying compensatory force over time.

20 Claims, 23 Drawing Sheets

(51) Int. Cl.
  *B64C 39/02* (2006.01)
  *F03D 13/25* (2016.01)
  *B64F 3/00* (2006.01)
  *B63J 99/00* (2009.01)
  *B63B 35/44* (2006.01)

(52) U.S. Cl.
  CPC ............... *F03D 9/32* (2016.05); *F03D 13/25* (2016.05); *B63B 35/44* (2013.01); *B63B 2035/446* (2013.01); *B63J 2099/006* (2013.01); *F05B 2240/923* (2013.01); *F05B 2240/93* (2013.01); *F05B 2240/95* (2013.01); *F05B 2270/404* (2013.01)

(56) References Cited

U.S. PATENT DOCUMENTS

| | | |
|---|---|---|
| 2015/0158600 A1 | 6/2015 | Hachtmann et al. |
| 2015/0183516 A1 | 7/2015 | Vander Lind |
| 2015/0183529 A1 | 7/2015 | Hachtmann et al. |
| 2015/0375873 A1 | 12/2015 | Gilroysmith et al. |
| 2017/0363067 A1* | 12/2017 | Hart .......................... F03D 9/32 |
| 2018/0245564 A1* | 8/2018 | Sheldon-Coulson ........................ F03B 13/189 |

\* cited by examiner

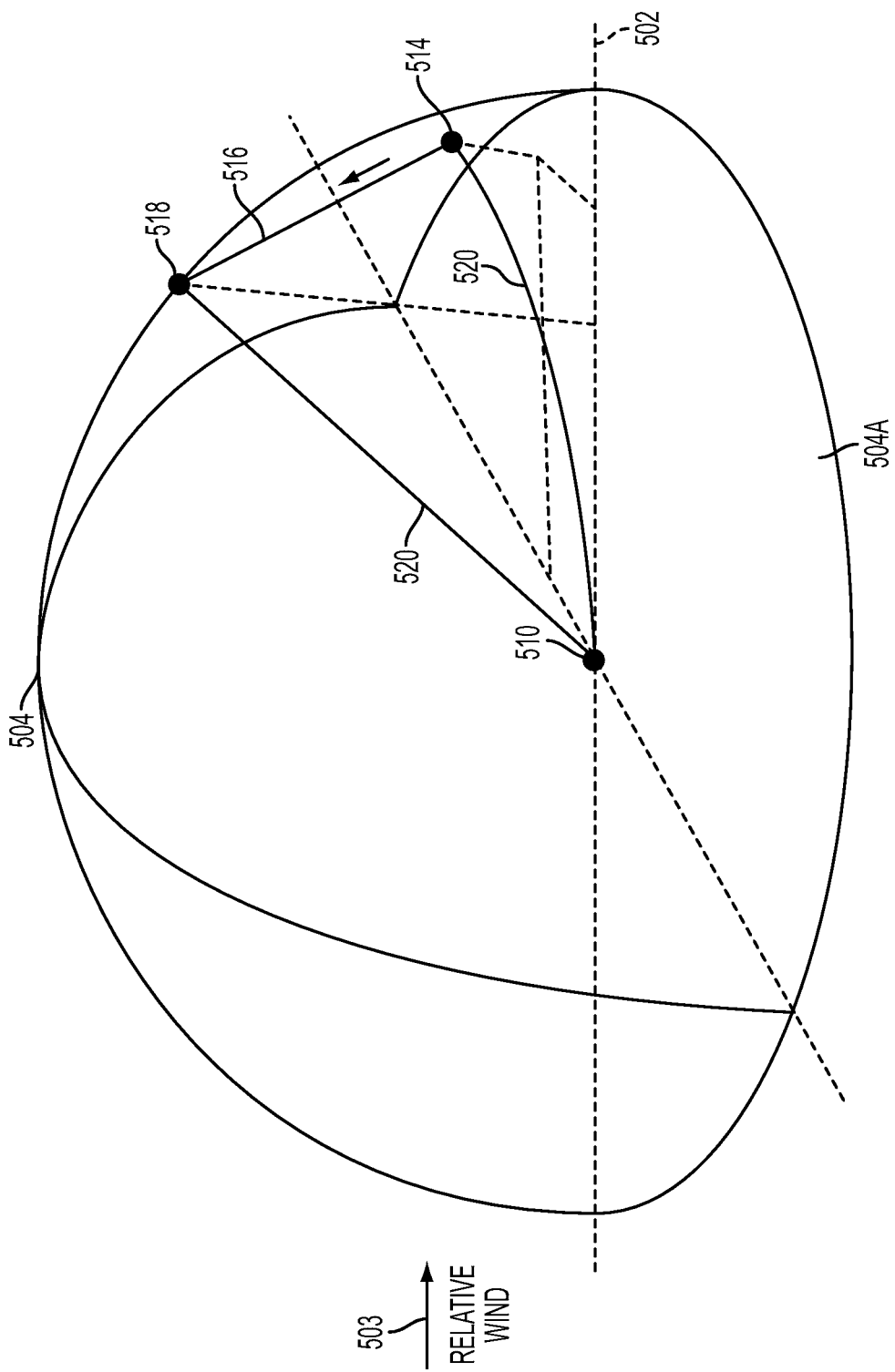

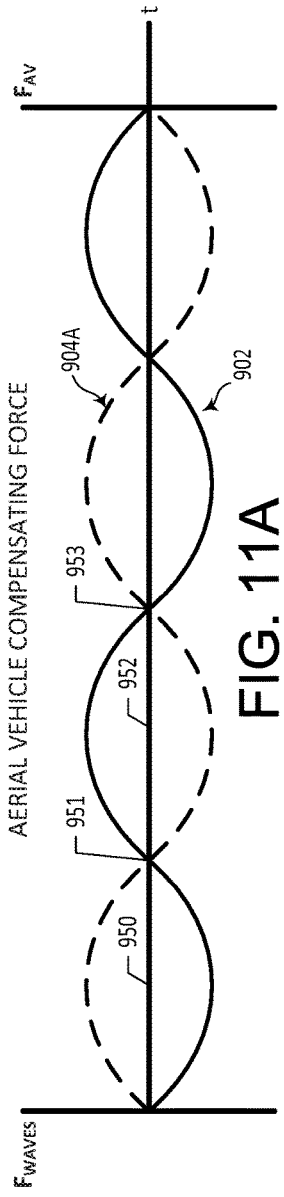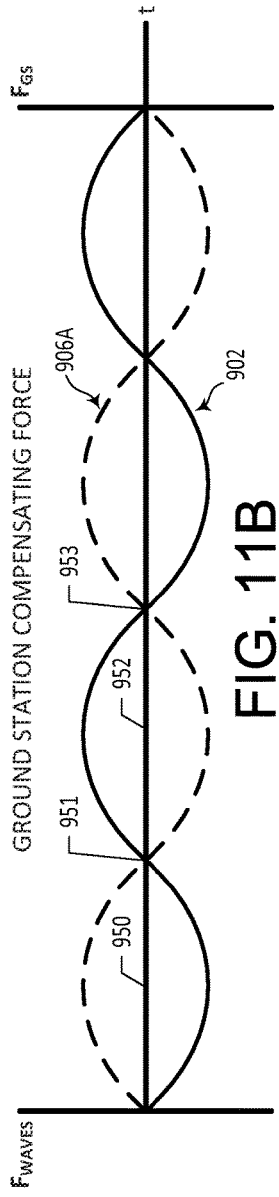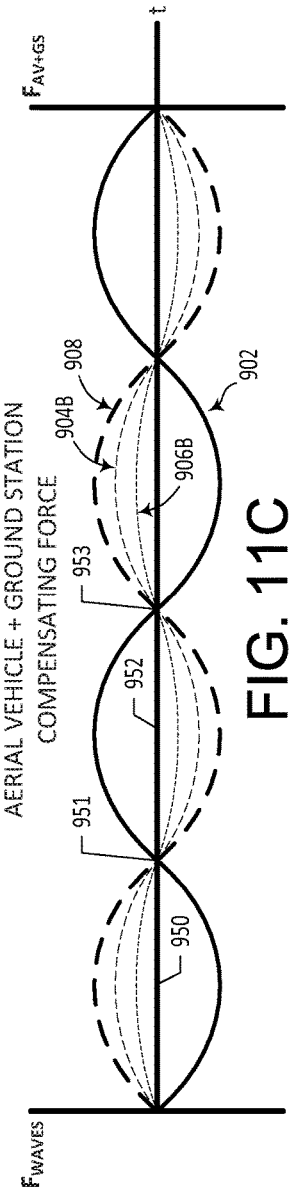

SECTION A-A

METHODS AND SYSTEMS FOR CONTROLLING MOTION OF FLOATING GROUND STATION

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine or AWT.

SUMMARY

Airborne wind turbines employ energy kites as aerial vehicles to harness wind power and convert it to electrical energy. The generated electrical energy is transmitted to ground stations via tethers that include one or more electrical conductors. Offshore floating ground stations may be subject to wave-induced and/or wind-induced oscillations. One or more aerial vehicles associated with the a ground station may use their thrusters (e.g., rotors) to apply a compensatory force to the oscillating ground station to reduce and/or substantially eliminate wave-induced oscillations. The aerial vehicle may be directly coupled to the ground station (e.g., landed) when applying compensatory force or may be coupled to the ground station via a tether when applying compensatory force. Alternatively or additionally, the ground station may include submerged thrusters that independently or additionally apply a compensatory force to the ground station to reduce or substantially eliminate oscillations. The submerged thrusters may also be used to rotate the ground station to a preferred alignment direction with the waves. To help counteract oscillatory behavior that is a periodic in nature (i.e., regularly repeating over a time span), control systems may use sensor data to develop a predictive force profile that maps desired compensatory force magnitude versus time, and the control systems may use that predictive force profile to direct the thruster to apply a varying compensatory force over time.

In one aspect, a method includes determining an oscillation profile of a floating airborne wind turbine ground station coupled to an airborne wind turbine aerial vehicle. The oscillation profile includes a period of oscillation and an amplitude. The method further includes applying a compensatory force to the ground station sufficient to reduce the amplitude of the oscillation profile. The compensatory force varies over time in a periodic manner.

In another aspect, a method of landing an aerial vehicle in an airborne wind turbine system is claimed. The system includes an aerial vehicle, a floating ground station configured to receive the aerial vehicle, at least one submerged thruster coupled to the ground station, a tether coupling the aerial vehicle to the ground station, and a winch drum coupled to the ground station and configured to wind the tether. The method includes (i) determining an oscillation direction of the ground station, (ii) rotating the ground station via the at least one submerged thruster until a direction of thrust from the at least one thruster is aligned with the oscillation direction; (iii) operating the winch drum to wind the tether; (iv) determining an oscillation profile of the ground station, wherein the oscillation profile includes a period of oscillation and an amplitude, and (v) applying a compensatory force to the ground station via the aerial vehicle, wherein the compensatory force is sufficient to reduce the amplitude of the oscillation profile, and wherein the compensatory force varies over time in a periodic manner.

In another aspect, airborne wind turbine system includes an aerial vehicle, a floating ground station, and a control system. The control system is configured to determine an oscillation profile of a floating airborne wind turbine ground station. The oscillation profile includes a period of oscillation and an amplitude. The ground station is coupled to an airborne wind turbine aerial vehicle. The control system is further configured to direct the application of a compensatory force to the ground station sufficient to reduce the amplitude of the oscillation profile, wherein the compensatory force varies over time in a periodic manner.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIGS. 5A and 5B depict a tether sphere, according to an example embodiment.

FIGS. 11A-C depict charts of wave force over time overlaid with compensatory force over time.

DETAILED DESCRIPTION

Figure 1:
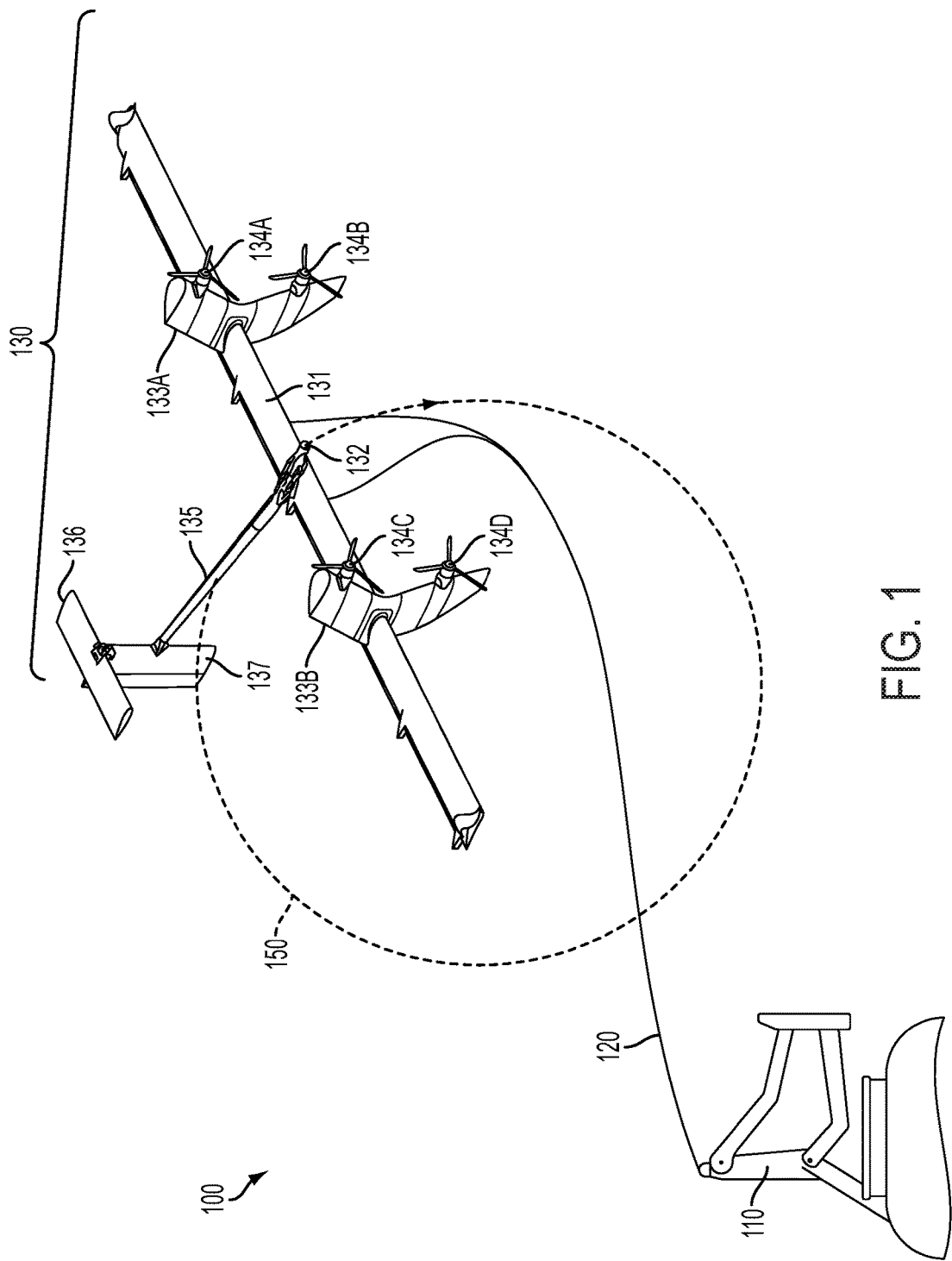
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. OVERVIEW

Floating ground stations in aerial wind turbine systems may suffer from wave-induced oscillation, which can make take-off or landing of aerial vehicles from or on the ground station difficult. To counteract the oscillation, an aerial vehicle coupled to the ground station may use its thrusters (e.g., rotors) to apply a compensatory force to the oscillating ground station to reduce and/or substantially eliminate the oscillations. If the aerial vehicle is landed on the ground station, thrust from aerial vehicle may act directly on the ground station. If the aerial vehicle is in flight (e.g., a hover mode), the thrust from the aerial vehicle may act through a tether connecting the aerial vehicle to the ground station.

Alternatively or additionally, the ground station may include one or more submerged thrusters that independently or additionally apply a compensatory force to the ground station to reduce or substantially eliminate oscillations. The submerged thrusters may also be used to rotate the ground station to a preferred alignment direction with the waves. For example, a vectored thruster may use a directional nozzle to direct water flow to induce a rotary torque on the ground station. As another example, a combination of thrusters on opposing sides of the ground station may be operated in opposing directions to induce a rotary torque on the ground station.

Wave-induced motion of a floating ground station may be periodic over short periods of time (e.g., 10 minutes). Accordingly, the floating ground station may have an oscillatory motion with a direction, amplitude, and frequency that is substantially constant over short periods of time. The ability to counteract that oscillatory motion for short periods of time can be extremely beneficial for aerial vehicles that take-off from, and land on, floating ground station. To help counteract oscillatory behavior that is a periodic in nature, control systems may use wind, wave, position, and/or displacement sensor data to develop a predictive force profile that maps desired compensatory force magnitude versus time. The control systems may use that predictive force profile to direct one or more thrusters on the aerial vehicle and/or ground station to apply a varying compensatory force over time that reduces or substantially cancels out the periodic oscillatory motion.

Systems and information described with respect to FIGS. 1 through 6C are generally illustrative of airborne wind turbines. Systems, methods, and charts described with respect to FIG. 7 and beyond are illustrative of airborne wind turbines with floating ground stations.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be configured to hold and/or support the aerial vehicle 130 until it is in an operational mode. The ground station 110 also may be configured to allow for the repositioning of the aerial vehicle 130 such that deployment of aerial vehicle 130 is possible. Further, the ground station 110 may be configured to receive the aerial vehicle 130 during a landing. The ground station 110 may be formed of any material that can suitably keep the aerial vehicle 130 attached and/or anchored to the ground while in hover flight, forward flight, and/or crosswind flight. In some implementations, a ground station 110 may be configured for use on land. However, a ground station 110 also may be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the deployed tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 also may be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may include or take the form of various types of devices, such as a kite (as illustrated in FIG. 1), a wing, and/or an airplane, among other possibilities. The aerial vehicle 130 may be formed of structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced above and below the main wing 131. In some examples, a vertical spacing between corresponding rotors (e.g., rotor 134A and rotor 134B or rotor 134C and rotor 134D) may be 0.5 to 3 meters.

The rotors 134A-D may be configured to drive one or more motor-generators for the purpose of generating electrical energy when the vehicle is operated in an electrical power generation mode. The rotors 134A-D may each include one or more blades, such as two, three, four, five, or more blades. The one or more rotor blades may rotate via interactions with the wind (or apparent wind) and be used to drive the one or more motor-generators. In addition, the rotors 134A-D also may be configured to provide a thrust to the aerial vehicle 130 during flight. With this arrangement, each of the rotors 134A-D may function as a propulsion units, such as a propeller, driven by a motor-generators when the vehicle is operated in a thrust flight mode. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 to 6 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 1 to 5 meters. Further, in some examples, the tail wing 136 may be located above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
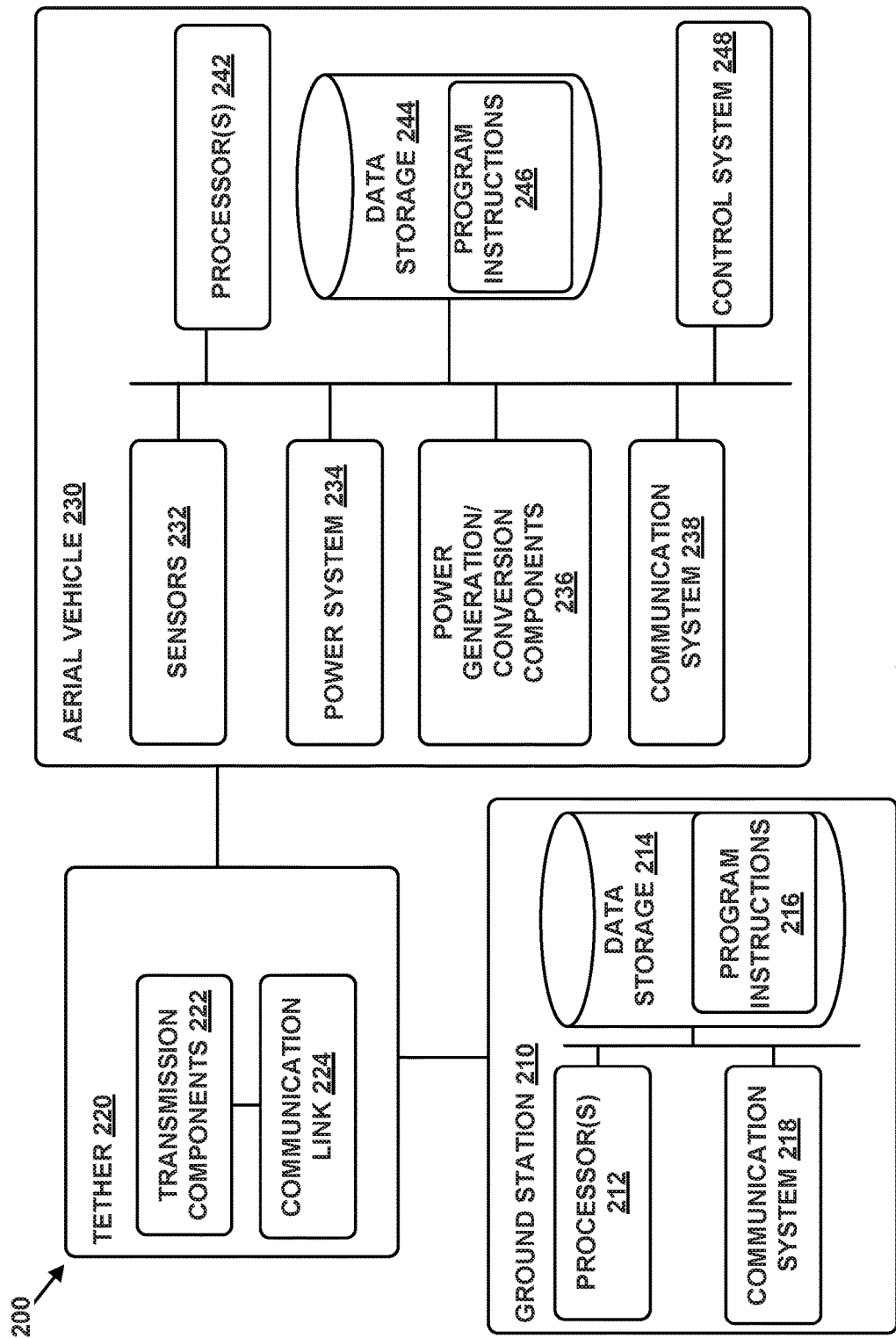
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNSS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs also may be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more motor-generators, such as high-speed, direct-drive motor-generators. With this arrangement, the one or more motor-generators may drive and be driven by one or more rotors, such as the rotors 134A-D. And in at least one such example, the one or more motor-generators may operate at full rated power at wind speeds of 11.5 meters per second at a capacity factor which may exceed 60 percent, and the one or more motor-generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

C. Transitioning an Aerial Vehicle from Hover Flight to Crosswind Flight

Figure 3A:
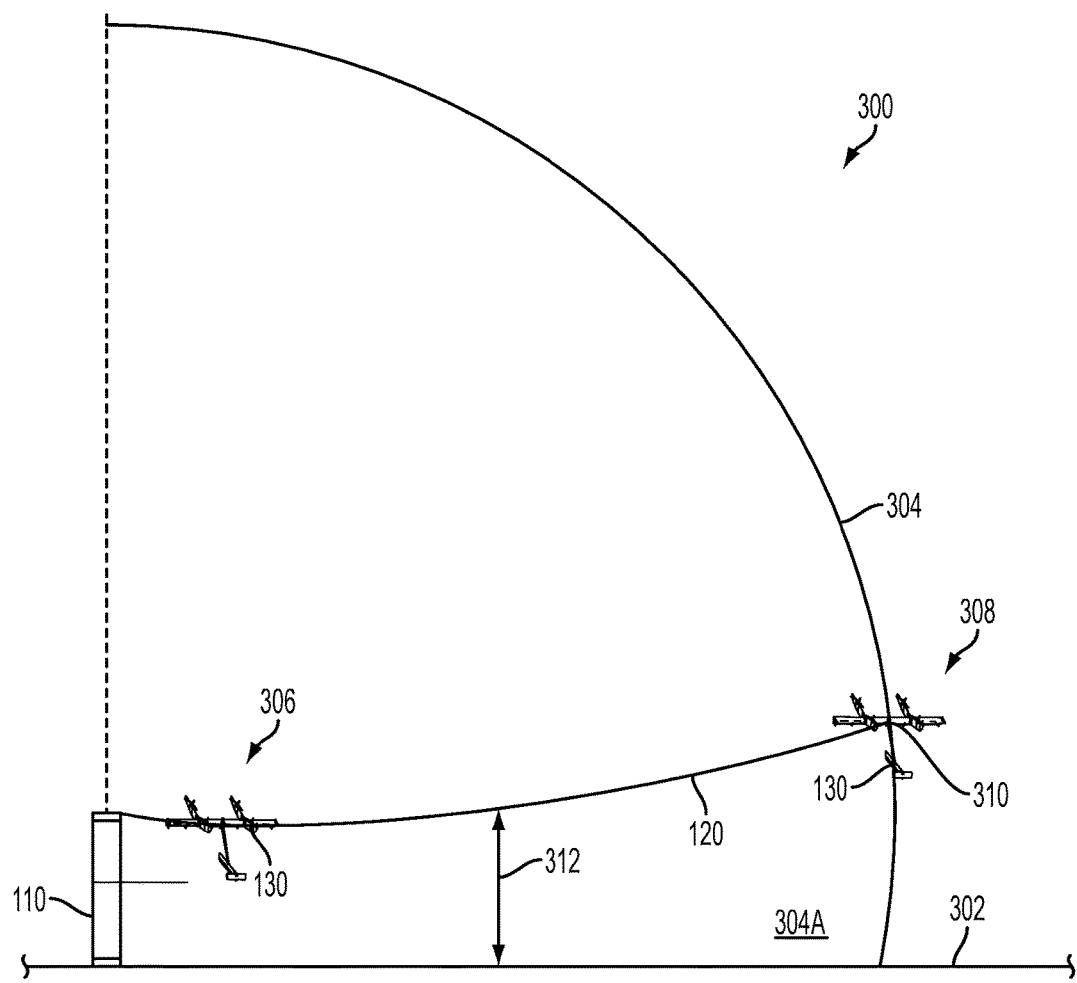
FIGS. 3A and 3B depict an example of an aerial vehicle transitioning from hover flight to crosswind flight, according to an example embodiment.
Figure 3B:
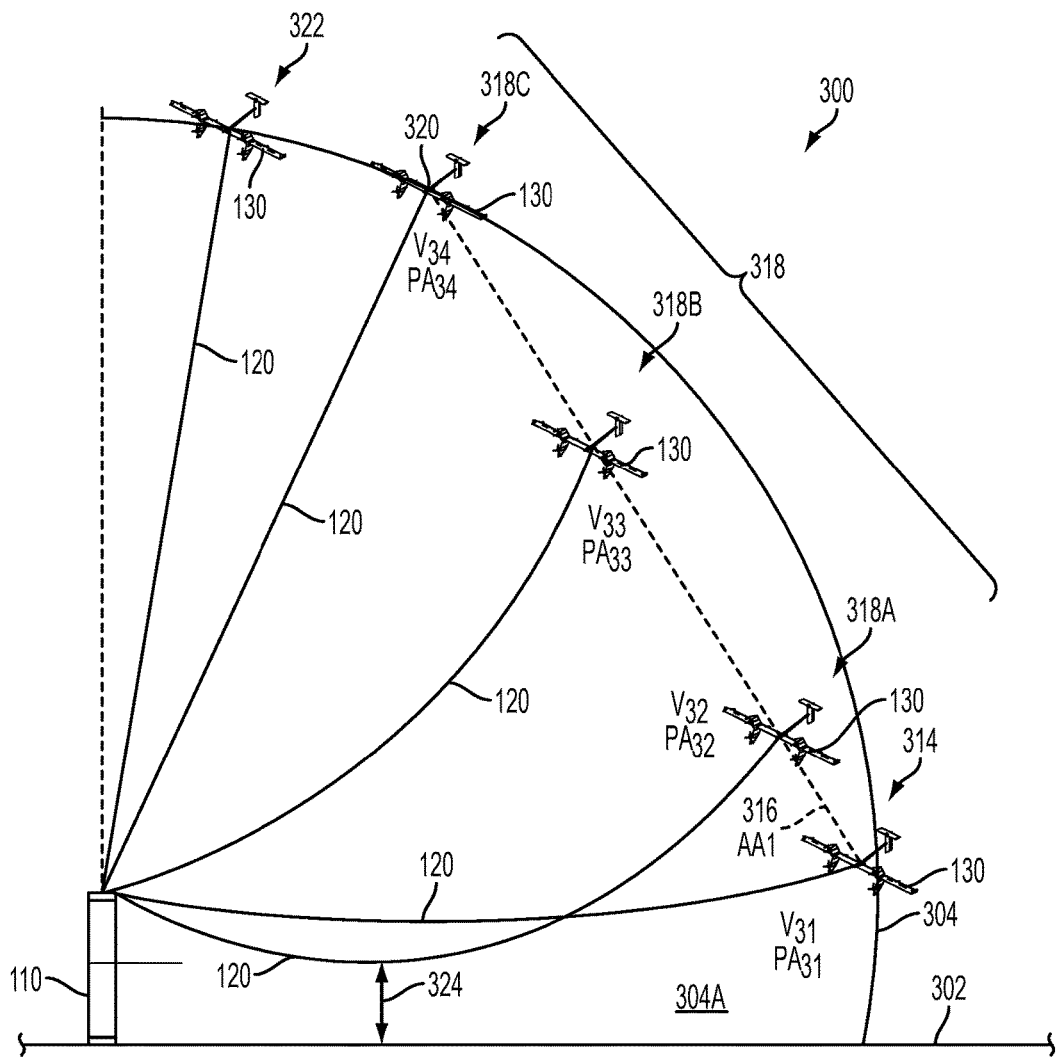

FIGS. 3A and 3B depict an example 300 of transitioning an aerial vehicle from hover flight to crosswind flight, according to an example embodiment. Hover flight may be an example of the AWT operating in thrust flight mode, with the motor-generators consuming power and driving the rotor rotation to provide thrust to the AWT. Crosswind flight may be an example of drag flight mode, with the wind or apparent wind rotating the rotors and the rotors driving the motor-generators to generate electrical power. Example 300 is generally described by way of example as being carried out by the aerial vehicle 130 described above in connection with FIG. 1. For illustrative purposes, example 300 is described in a series of actions as shown in FIGS. 3A and 3B, though example 300 could be carried out in any number of actions and/or combination of actions.

As shown in FIG. 3A, the aerial vehicle 130 is connected to the tether 120, and the tether 120 is connected to the ground station 110. The ground station 110 is located on ground 302. Moreover, as shown in FIG. 3A, the tether 120 defines a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302.

The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 while the aerial vehicle 130 is in the hover-flight orientation positioning the aerial vehicle 130 at a first location 310 that is substantially on the tether sphere 304. As shown in FIG. 3A, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. For example, as shown in FIG. 3A, at point 308 the tether 120 may be extended. With this arrangement, the tether 120 may be in a catenary configuration. Moreover, at point 306 and point 308, a bottom of the tether 120 may be a predetermined altitude 312 above the ground 302. With this arrangement, at point 306 and point 308 the tether 120 may not contact the ground 302.

Example 300 continues at point 314 with transitioning the aerial vehicle 130 from the hover-flight orientation to a forward-flight orientation, such that the aerial vehicle 130 moves from the tether sphere 304. As shown in FIG. 3B, the aerial vehicle 130 may move from the tether sphere 304 to a location toward the ground station 110 (which may be referred to as being inside the tether sphere 304).

When the aerial vehicle 130 is in the forward-flight orientation, the aerial vehicle 130 may engage in forward flight (which may be referred to as airplane-like flight). Forward flight may be an example of the AWT operating in thrust flight mode, with the motor-generators consuming power and driving the rotor rotation to provide thrust to the AWT. For instance, when the aerial vehicle 130 engages in forward flight, the aerial vehicle 130 may ascend. The forward-flight orientation of the aerial vehicle 130 could take the form of an orientation of a fixed-wing aircraft (e.g., an airplane) in horizontal flight. In some examples, transitioning the aerial vehicle 130 from the hover-flight orientation to the forward-flight orientation may involve a flight maneuver, such as pitching forward. And in such an example, the flight maneuver may be executed within a time period, such as less than one second.

At point 314, the aerial vehicle 130 may achieve attached flow. Further, at point 314, a tension of the tether 120 may be reduced. With this arrangement, a curvature of the tether 120 at point 314 may be greater than a curvature of the tether 120 at point 308. As one example, at point 314, the tension of the tether 120 may be less than 1 KN, such as 500 newtons (N).

Example 300 continues at one or more points 318 with operating the aerial vehicle 130 in the forward-flight orientation to ascend at an angle of ascent AA1 to a second location 320 that is substantially on the tether sphere 304. As shown in FIG. 3B, the aerial vehicle 130 may fly substantially along a path 316 during the ascent at one or more points 318. In this example, one or more points 318 is shown as three points, a point 318A, a point 318B, and a point 318C. However, in other examples, one or more points 318 may include less than three or more than three points.

In some examples, the angle of ascent AA1 may be an angle between the path 316 and the ground 302. Further, the path 316 may take various different forms in various different embodiments. For instance, the path 316 may be a line segment, such as a chord of the tether sphere 304.

In some implementations, the aerial vehicle 130 may have attached flow during the ascent. Moreover, in such an implementation, effectiveness of one or more control surfaces of the aerial vehicle 130 may be maintained. Further, in such an implementation, example 300 may involve selecting a maximum angle of ascent, such that the aerial vehicle 130 has attached flow during the ascent. Moreover, in such an implementation, example 300 may involve adjusting a pitch angle of the aerial vehicle 130 based on the maximum angle of ascent and/or adjusting thrust of the aerial vehicle 130 based on the maximum angle of ascent. In some examples, adjusting thrust of the aerial vehicle 130 may involve using differential thrusting of one or more of the rotors 134A-D of the aerial vehicle 130. The pitch angle may be an angle between the aerial vehicle 130 and a vertical axis that is substantially perpendicular to the ground 302.

As shown in FIG. 3B, at point 314 the aerial vehicle 130 may have a speed V31 and a pitch angle PA31; at point 318A the aerial vehicle 130 may have a speed V32 and a pitch angle PA32; at point 318B the aerial vehicle 130 may have a speed V33 and a pitch angle PA33; and at point 318C the aerial vehicle 130 may have a speed V34 and a pitch angle PA34.

In some implementations, the angle of ascent AA1 may be selected before point 318A. With this arrangement, the pitch angle PA31 and/or the pitch angle PA32 may be selected based on the angle of ascent AA1. Further, in some examples, the pitch angle PA32, the pitch angle PA33, and/or the pitch angle PA34 may be equal to the pitch angle PA31. However, in other examples, the pitch angles PA31, PA32, PA33, and/or PA34 may be different than each other. For instance, the pitch angle PA31 may be greater or less than pitch angles PA32, PA33, and/or PA34; the pitch angle PA32 may be greater or less than pitch angles PA33, PA34, and/or PA31; the pitch angle PA33 may be greater or less than pitch angles PA34, PA31, and/or PA32; and the pitch angle PA34 may be greater or less than pitch angles PA31, PA32, and/or PA33. Further, the pitch angle PA33 and/or PA34 may be selected and/or adjusted during the ascent. Further still, the pitch angle PA31 and/or PA32 may be adjusted during the ascent.

Moreover, in some implementations, the speed V31 and/or the speed V32 may be selected based on the angle of ascent AA1. Further, in some examples, the speed V32, the speed V33, and the speed V34 may be equal to the speed V31. However, in other examples, speeds V31, V32, V33, and V34 may be different than each other. For example, the speed V34 may be greater than the speed V33, the speed V33 may be greater than the speed V32, and the speed V32 may be greater than the speed V31. Further, speeds V31, V32, V33, and/or V34 may be selected and/or adjusted during the ascent.

In some implementations, any or all of the speeds V31, V32, V33, and/or V34 may be a speed that corresponds with a maximum (or full) throttle of the aerial vehicle 130. Further, in some implementations, at the speed V32, the aerial vehicle 130 may ascend in a forward-flight orientation. Moreover, at the speed V32, the angle of ascent AA1 may be converged.

As shown in FIG. 3B, the second location 320 may be in the air and substantially downwind of the ground station 110. The second location 320 may be oriented with respect to the ground station 110 in a similar way as the first location 310 may be oriented with respect to the ground station 110.

For example, the second location 320 may be at a first angle from an axis extending from the ground station 110 that is substantially parallel to the ground 302. In some implementations, the first angle may be 30 degrees from the axis. In some situations, the first angle may be referred to as azimuth, and the angle may be between 30 degrees clockwise from the axis and 330 degrees clockwise from the axis, such as 15 degrees clockwise from the axis or 345 degrees clockwise from the axis.

In addition, as shown in FIG. 3B, the second location 320 may be substantially upwind of the first location 310. The term "substantially upwind," as used in this disclosure, refers to exactly upwind and/or one or more deviations from exactly upwind that do not significantly impact transitioning an aerial vehicle between certain flight modes as described herein.

At one or more points 318, a tension of the tether 120 may increase during the ascent. For example, a tension of the tether 120 at point 318C may be greater than a tension of the tether 120 at point 318B, a tension of the tether 120 at point 318B may be greater than a tension of the tether 120 at point 318A. Further, a tension of the tether 120 at point 318A may be greater than a tension of the tether at point 314.

With this arrangement, a curvature of the tether 120 may decrease during the ascent. For example, a curvature the tether 120 at point 318C may be less than a curvature the tether at point 318B, and a curvature of the tether 120 at point 318B may be less than a curvature of the tether at point 318A. Further, in some examples, a curvature of the tether 120 at point 318A may be less than a curvature of the tether 120 at point 314.

Moreover, in some examples, when the aerial vehicle 130 includes a GPS receiver, operating the aerial vehicle 130 in the forward-flight orientation to ascend at an angle of ascent may involve monitoring the ascent of the aerial vehicle 130 with the GPS receiver. With such an arrangement, control of a trajectory of the aerial vehicle 130 during the ascent may be improved. As a result, the aerial vehicle 130's ability to follow one or more portions and/or points of the path 316 may be improved.

Further, in some examples, when the aerial vehicle 130 includes at least one pitot tube, operating the aerial vehicle 130 in a forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle during the ascent may be improved. As a result, the aerial vehicle 130's ability to follow one or more portions and/or points of the path 316 may be improved. The angle of attack may be an angle between a body axis of the aerial vehicle 130 and an apparent wind vector. Further, the side slip may be an angle between a direction substantially perpendicular to a heading of the aerial vehicle 130 and the apparent wind vector.

Example 300 continues at a point 322 with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver.

When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

As shown in FIG. 3B, at points 314-322 a bottom of the tether 120 may be a predetermined altitude 324 above the ground 302. With this arrangement, at points 314-322 the tether 120 may not touch the ground 302. In some examples, the predetermined altitude 324 may be less than the predetermined altitude 312. In some implementations, the predetermined altitude 324 may be greater than one half of the height of the ground station 110. And in at least one such implementation, the predetermined altitude 324 may be 6 meters.

Thus, example 300 may be carried out so that the tether 120 may not contact the ground 302. With such an arrangement, the mechanical integrity of the tether 120 may be improved. For example, the tether 120 might not catch on (or tangle around) objects located on the ground 302. As another example, when the tether sphere 304 is located above a body of water (e.g., an ocean, a sea, a lake, a river, and the like), the tether 120 might not be submersed in the water. In addition, with such an arrangement, safety of one or more people located near the ground station 110 (e.g., within the portion 304A of the tether sphere 304) may be improved.

In addition, example 300 may be carried out so that a bottom of the tether 120 remains above the predetermined altitude 324. With such an arrangement, the mechanical integrity of the tether 120 may be improved as described herein and/or safety of one or more people located near the ground station 110 (e.g., within the portion 304A of the tether sphere 304) may be improved.

Moreover, one or more actions that correspond with points 306-322 may be performed at various different time periods in various different embodiments. For instance, the one or more actions that correspond with point 306 may be performed at a first time period, the one or more actions that correspond with point 308 may be performed at a second time period, the one or more actions that correspond with point 314 may be performed at a third time period, the one or more actions that correspond with point 318A may be performed at a fourth time period, the one or more actions that correspond with point 318B may be performed at a fifth time period, the one or more actions that correspond with point 318C may be performed at a sixth time period, and the one or more actions that correspond with point 322 may be performed at a seventh time period. However, in other examples, at least some of the actions of the one or more actions that correspond with points 306-322 may be performed concurrently.

Figure 4A:
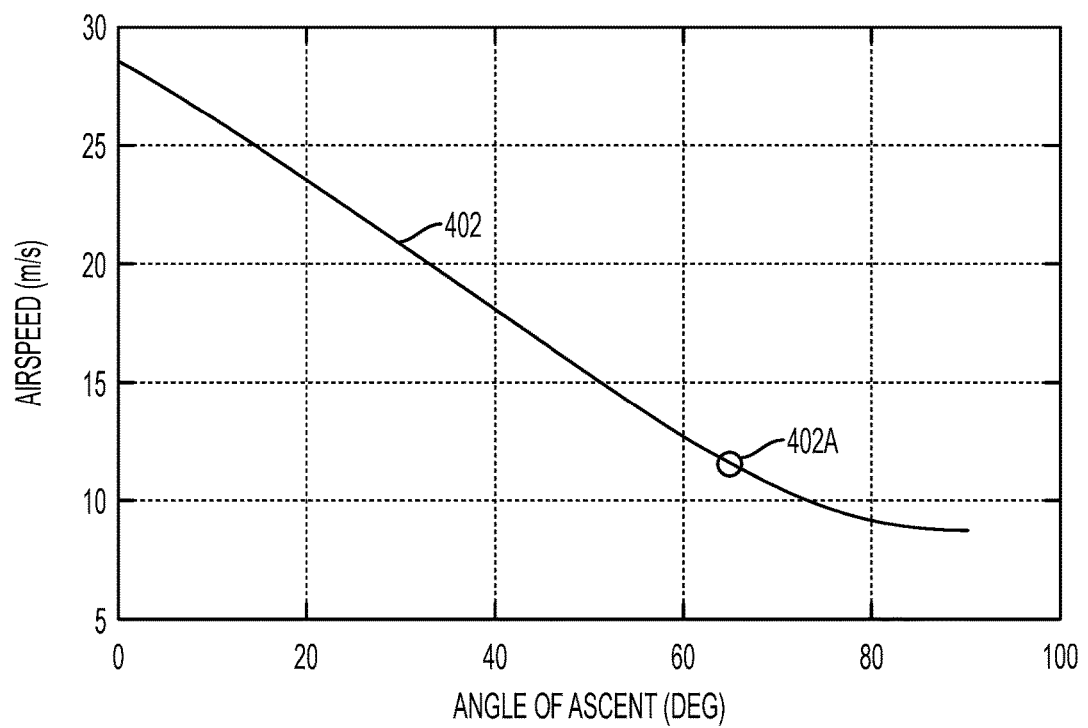
FIGS. 4A-C are graphical representations involving an angle of ascent, according to an example embodiment.
Figure 4B:
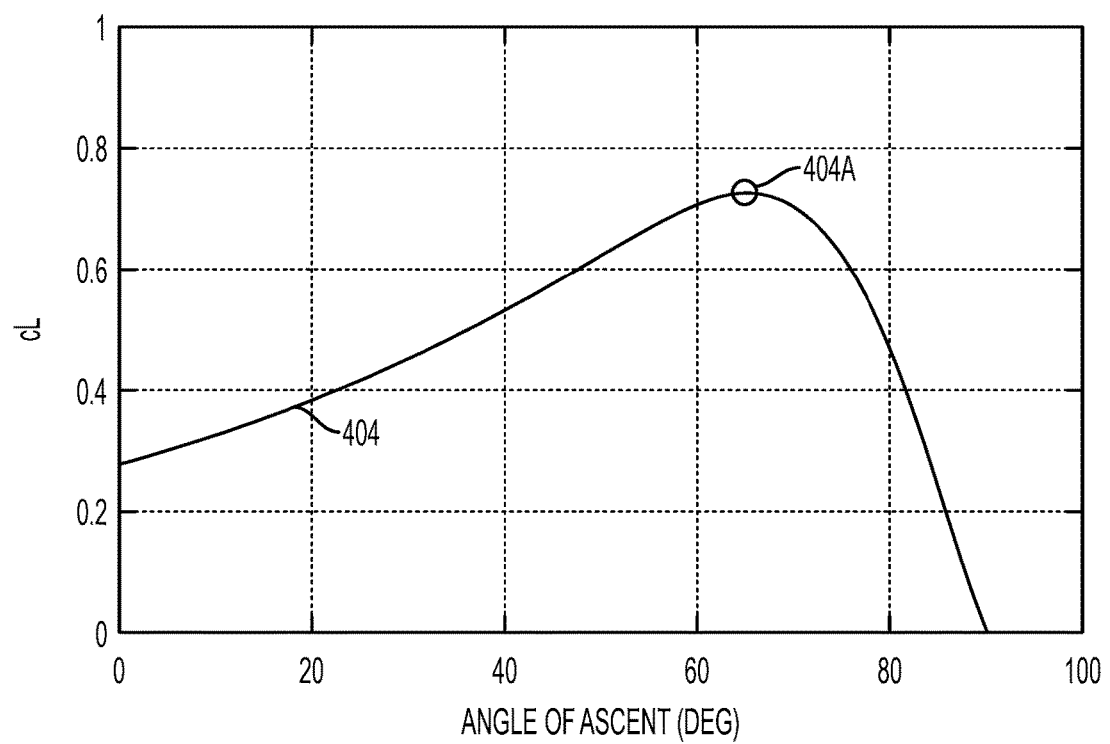
Figure 4C:
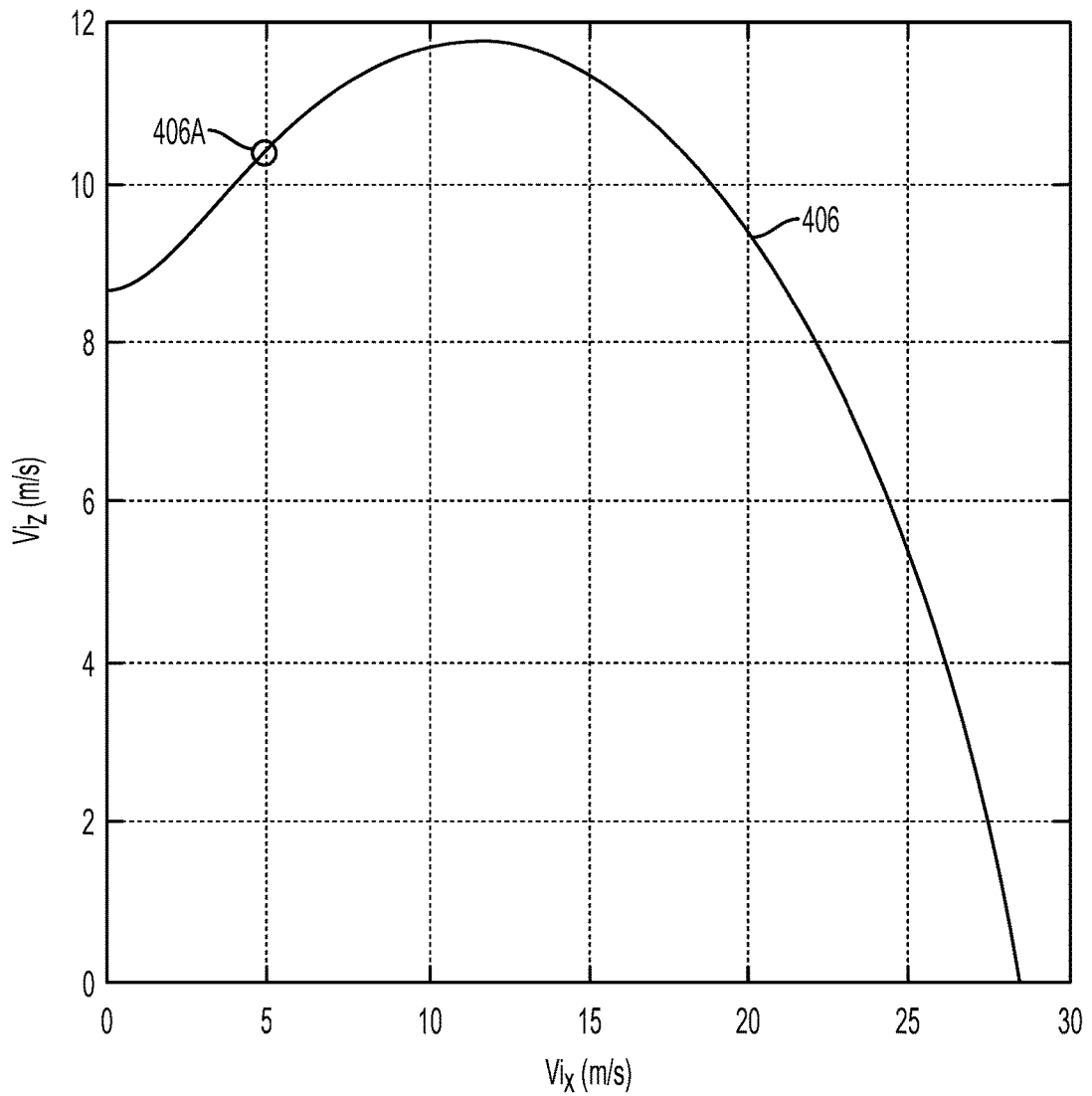

FIGS. 4A-C are graphical representations involving an angle of ascent, according to an example embodiment. In particular, FIG. 4A is a graphical representation 402, FIG. 4B is a graphical representation 404, and FIG. 4C is a graphical representation 406. Each of graphical representations 402, 404, and 406 may be based on example 300.

More specifically, in FIGS. 4A-C, an aerial vehicle in an example of transitioning the aerial vehicle from hover flight to crosswind flight may have a thrust-to-weight ratio (T/W) of 1.3 and a coefficient of drag ($C_D$) equal to the equation $3+(C_L^2/eAR\pi)$, where $C_L$ is coefficient of lift, e is span efficiency of the aerial vehicle, and AR is aspect ratio of the aerial vehicle. However, in other examples, aerial vehicles described herein may have various other thrust-to-weight ratios, such as a thrust-to-weight ratio greater than 1.2. Further, in other examples, aerial vehicles described herein may have various other values of $C_D$, such as a value of $C_D$ between 0.1 and 0.2.

As noted, FIG. 4A is the graphical representation 402. In particular, the graphical representation 402 depicts an angle of ascent of an aerial vehicle in relation to air speed. In graphical representation 402, the angle of ascent may be measured in degrees, and the airspeed may be measured in m/s. As shown in FIG. 4A, a point 402A on the graphical representation 402 may represent a maximum angle of ascent of an aerial vehicle for attached flow during an ascent, such as at one or more points 318 in example 300. In graphical representation 402, the maximum angle of ascent may be about 65 degrees, and an airspeed that corresponds with the maximum angle of ascent may be about 11 m/s.

Moreover, as noted, FIG. 4B is the graphical representation 404. In particular, the graphical representation 404 depicts an angle of ascent of an aerial vehicle in relation to $C_L$ of the aerial vehicle. In graphical representation 404, the angle of ascent may be measured in degrees, and $C_L$ may be a value without a unit of measurement. As shown in FIG. 4B, a point 404A on the graphical representation 404 may represent a maximum angle of ascent of an aerial vehicle for attached flow during an ascent, such as at one or more points 318 in example 300. In graphical representation 404, the maximum angle of ascent may be about 65 degrees, and the $C_L$ that corresponds with the maximum angle of ascent may be about 0.7.

Further, as noted, FIG. 4C is the graphical representation 406. In particular, the graphical representation 406 depicts a first component of a speed of an aerial vehicle in relation to a second component of the speed of the aerial vehicle. In graphical representation 406, the first and second components of speed of the aerial vehicle may be measured in m/s. In some examples, the first component of the speed of the aerial vehicle may be in a direction that is substantially parallel with the ground. Further, in some examples, the second component of the speed of the aerial vehicle may be in a direction that is substantially perpendicular with the ground.

As shown in FIG. 4C, a point 406A on the graphical representation 406 may represent a first and second component of a speed of the aerial vehicle when the aerial vehicle is at a maximum angle of ascent for attached flow during an ascent, such as at one or more points 318 in example 300. In graphical representation 406, the first component of the speed of the aerial vehicle that corresponds with the maximum angle of ascent may about 5 m/s, and the second component of the speed of the aerial vehicle that corresponds with the maximum angle of ascent may be about 10.25 m/s.

Figure 5A:
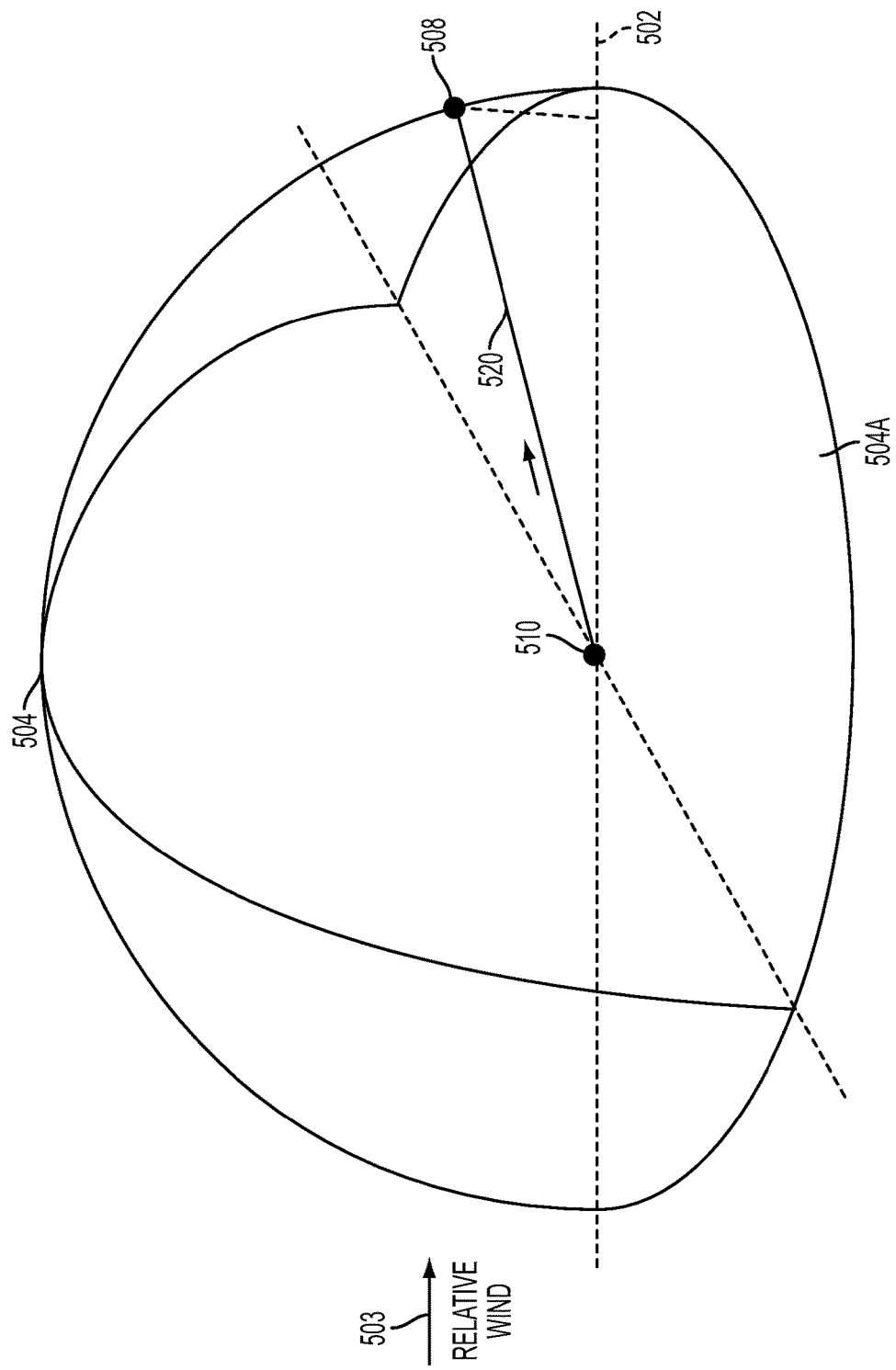

FIGS. 5A and 5B depict a tether sphere 504, according to an example embodiment. In particular, the tether sphere 504 has a radius based on a length of a tether 520, such as a length of the tether 520 when it is extended. As shown in FIGS. 5A and 5B, the tether 520 is connected to a ground station 510, and the ground station 510 is located on ground 502. Further, as shown in FIGS. 5a and 5b, relative wind 503 contacts the tether sphere 504. In FIGS. 5A and 5B, only a portion of the tether sphere 504 that is above the ground 502 is depicted. The portion may be described as one half of the tether sphere 504.

The ground 502 may take the form of or be similar in form to the ground 302, the tether sphere 504 may take the form of or be similar in form to the tether sphere 304, the ground station 510 may take the form of or be similar in form to the ground station 110 and/or the ground station 210, and the tether 520 may take the form of or be similar in form to the tether 120 and/or the tether 220.

Examples of transitioning an aerial vehicle between hover flight and crosswind flight described herein may be carried out in and/or substantially on a first portion 504A of the tether sphere 504. As shown in FIGS. 5A and 5B, the first portion 504A of the tether sphere 504 is substantially downwind of the ground station 510. The first portion 504A may be described as one quarter of the tether sphere 504. The first portion 504A of the tether sphere 504 may take the form of or be similar in form to the portion 304A of the tether sphere 304.

Moreover, examples of transitioning an aerial vehicle between hover flight and crosswind flight described herein may be carried out at a variety of locations in and/or on the first portion 504A of the tether sphere 504. For instance, as shown in FIG. 5A, while the aerial vehicle is in a hover-flight orientation, the aerial vehicle may be positioned at a point 508 that is substantially on the first portion 504A of the tether sphere 504.

Further, as shown in FIG. 5B, when the aerial vehicle transitions from the hover-flight orientation to a forward-flight orientation, the aerial vehicle may be positioned at a point 514 that is inside the first portion 504A of the tether sphere 504. Further still, as shown in FIG. 5b, when the aerial vehicle ascends in the forward-flight orientation to a point 518 that is substantially on the first portion 504A of the tether sphere 504, the aerial vehicle may follow a path 516. The path 516 may take the form of a variety of shapes. For instance, the path 516 may be a line segment, such as a chord of the tether sphere 504. Other shapes and/or types of shapes are possible as well.

The point 508 may correspond to point 308 in example 300, the point 514 may correspond to point 314 in example 300, the point 518 may correspond to point 318C in example 300, and the path 516 may take the form of or be similar in form to the path 316.

Further, in accordance with this disclosure, the point 508 and the point 518 may be located at various locations that are substantially on the first portion 504A of the tether sphere 504, and the point 514 may be located at various locations that are inside the first portion 504A of the tether sphere 504.

D. Transitioning an Aerial Vehicle from Crosswind Flight to Hover Flight

Figure 6A:
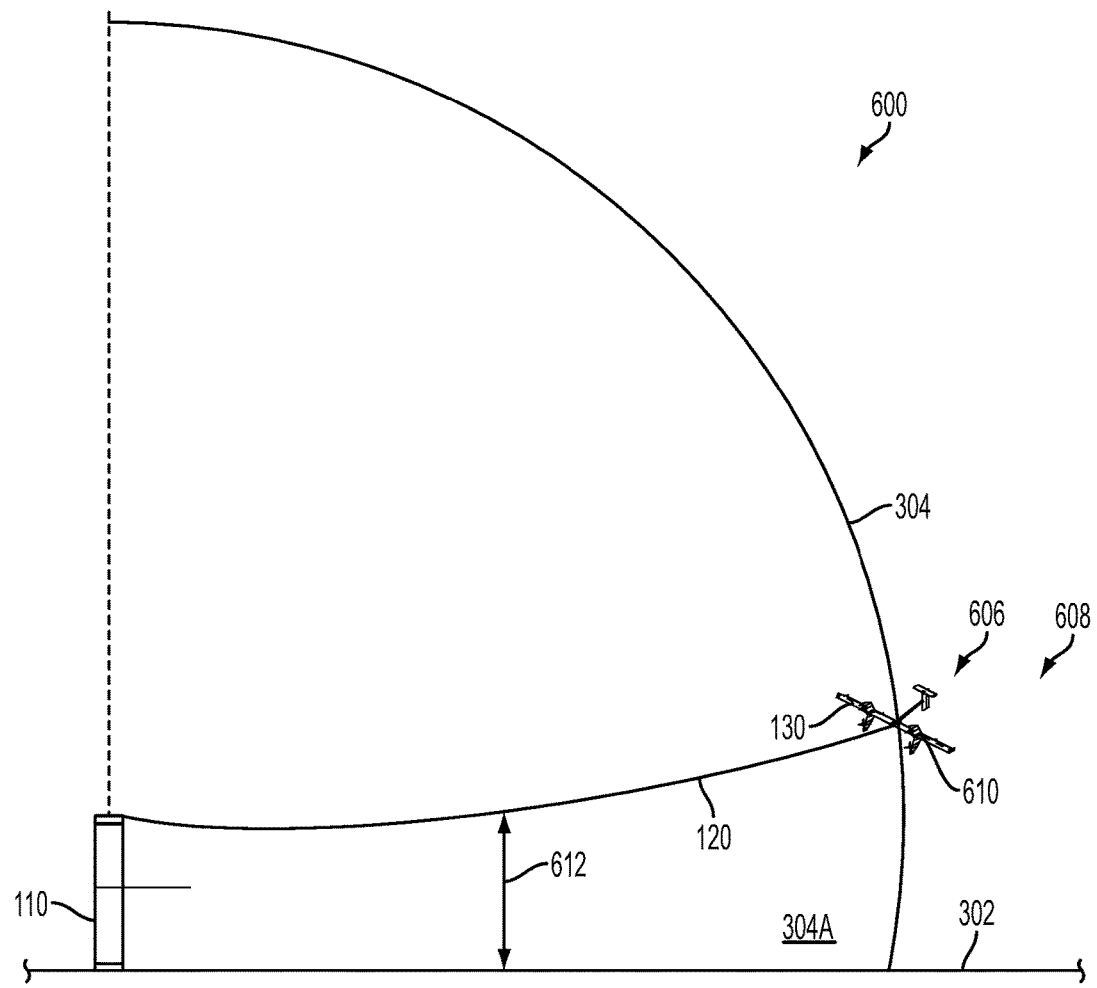
FIGS. 6A-C depict an example of an aerial vehicle transitioning from crosswind flight to hover flight, according to an example embodiment.
Figure 6B:
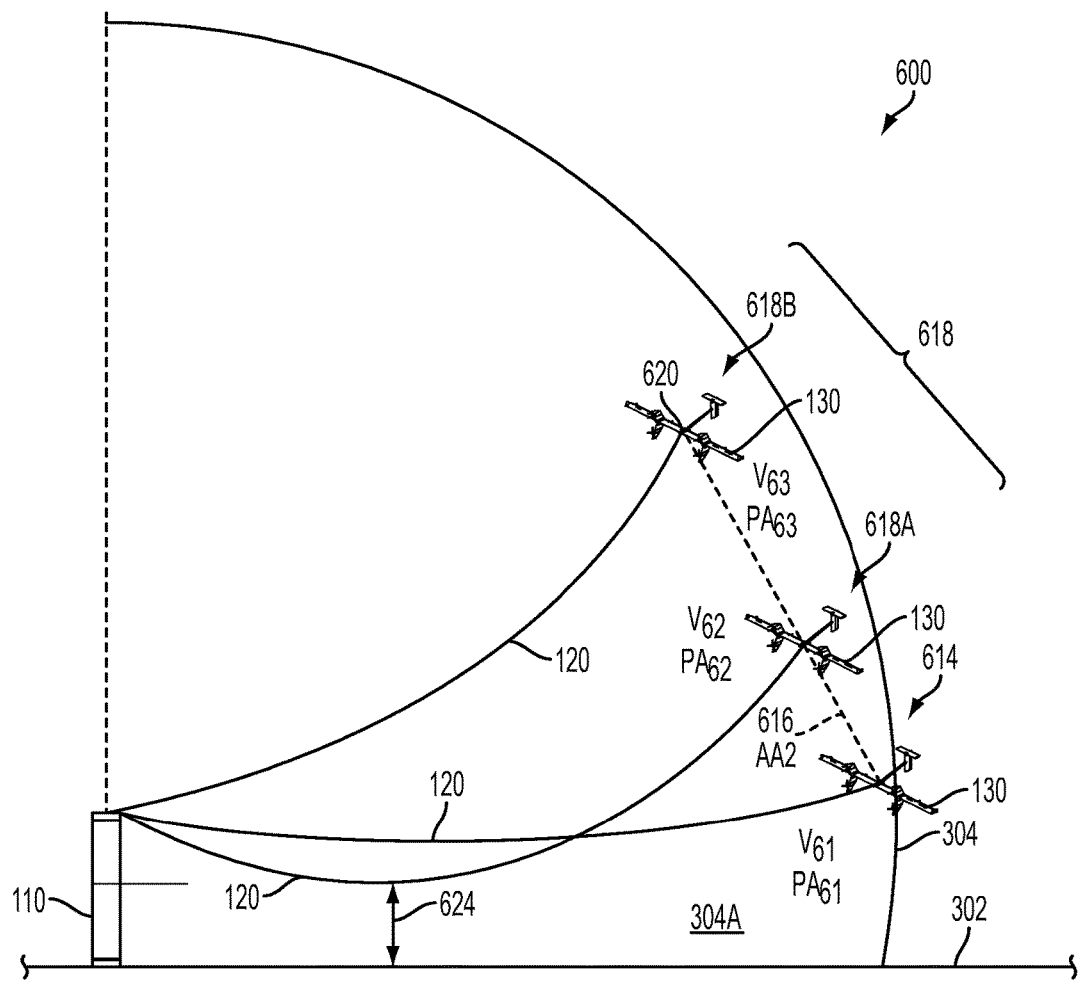
Figure 6C:
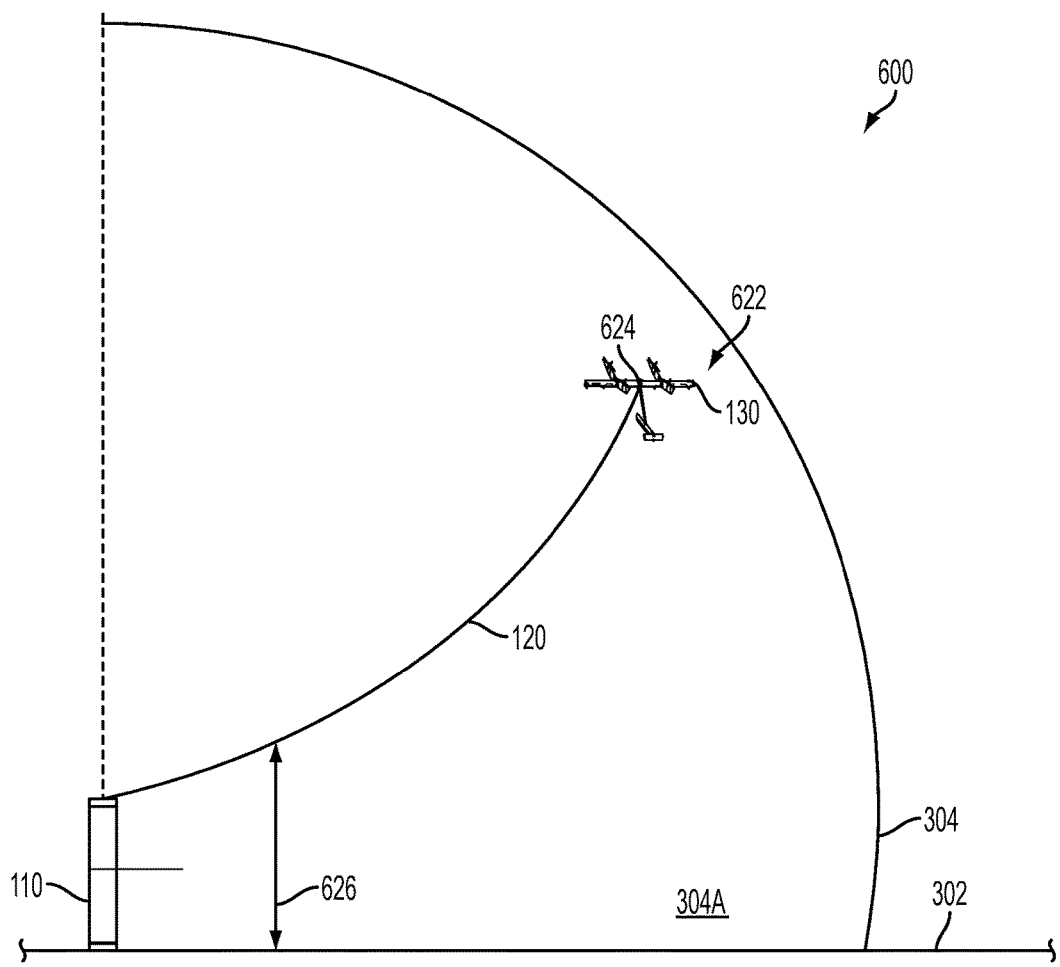

FIGS. 6A-C depict an example 600 of transitioning an aerial vehicle from crosswind flight to hover flight, according to an example embodiment. Example 600 is generally described by way of example as being carried out by the aerial vehicle 130 described above in connection with FIG. 1. For illustrative purposes, example 600 is described in a series of actions of the aerial vehicle 130 as shown in FIGS. 6A-C, though example 600 could be carried out in any number of actions and/or combination of actions.

As shown in FIG. 6A, the aerial vehicle 130 is connected to the tether 120, and the tether 120 is connected to the ground station 110. The ground station 110 is located on the ground 302. Moreover, as shown in FIG. 6A, the tether 120 defines the tether sphere 304. Example 600 may be carried out in and/or substantially on the portion 304A of the tether sphere 304.

Example 600 begins at a point 606 with operating the aerial vehicle 130 in a crosswind-flight orientation. When the aerial vehicle is in the crosswind-flight orientation, the aerial vehicle 130 may engage in crosswind flight. Moreover, at point 606 the tether 120 may be extended.

Example 600 continues at a point 608 with while the aerial vehicle 130 is in the crosswind-flight orientation, positioning the aerial vehicle 130 at a first location 610 that is substantially on the tether sphere 304. (In some examples, the first location 610 may be referred to as a third location). As shown in FIG. 6A, the first location 610 may in the air and substantially downwind of the ground station 110. The first location 610 may take the form of or be similar in form to the first location 310. However, in some examples, the first location 610 may have an altitude that is greater than an altitude of the first location 310.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

Moreover, at point 606 and point 608, a bottom of the tether 120 may be a predetermined altitude 612 above the ground 302. With this arrangement, at point 606 and point 608 the tether 120 may not contact the ground 302. The predetermined altitude 612 may be greater than, less than, and/or equal to the predetermined altitude 312.

Example 600 continues at a point 614 with transitioning the aerial vehicle from the crosswind-flight orientation to a forward-flight orientation, such that the aerial vehicle 130 moves from the tether sphere 120. As shown in FIG. 6B, the aerial vehicle 130 may move from the tether sphere 304 to a location toward the ground station 110.

When the aerial vehicle 130 is in the forward-flight orientation, the aerial vehicle may engage in forward flight. In some examples, transitioning the aerial vehicle 130 from the crosswind-flight orientation to the forward-flight orientation may involve a flight maneuver, such as pitching forward. Further, in such an example, the flight maneuver may be executed within a time period, such as less than one second.

At point 614, the aerial vehicle 130 may achieve attached flow. Further, at point 314, a tension of the tether 120 may be reduced. With this arrangement, a curvature of the tether 120 at point 614 may be greater than a curvature of the tether 120 at point 608.

Example 600 continues at one or more points 618 with operating the aerial vehicle 130 in the forward-flight orientation to ascend at an angle of ascent AA2 to a second location 620. (In some examples, the second location 620 may be referred to as a fourth location). As shown in FIG. 6B, the aerial vehicle 130 may fly substantially along a path 616 during the ascent at one or more points 618. In this example, one or more points 618 includes two points, a point 618A and point 618B. However, in other examples, one or more points 618 may include less than two or more than two points.

In some examples, the angle of ascent AA2 may be an angle between the path 618 and the ground 302. Further, the path 616 may take various different forms in various different embodiments. For instance, the path 616 may a line segment, such as a chord of the tether sphere 304. Other shapes and/or types of shapes are possible as well. The angle of ascent AA2 may take the form of or be similar in form to the angle of ascent AA1, and the path 616 may take the form of or be similar in form to the path 316.

In some implementations, at one or more points 618, the aerial vehicle 130 may ascend with substantially no thrust provided by the rotors 134A-D of the aerial vehicle 130. With this arrangement, the aerial vehicle 130 may decelerate during the ascent. For instance, at one or more points 618, the rotors 134A-D of the aerial vehicle 130 may be shutoff. The term "substantially no," as used in this disclosure, refers to exactly no and/or one or more deviations from exactly no that do not significantly impact transitioning between certain flight modes as described herein.

Moreover, in some implementations, the aerial vehicle 130 may have attached flow during the ascent. And in such an implementation, effectiveness of one or more control surfaces of the aerial vehicle 130 may be maintained. Further, in such an implementation, example 600 may involve selecting a maximum angle of ascent, such that the aerial vehicle 130 has attached flow during the ascent. Moreover, in such an implementation, example 600 may involve adjusting a pitch angle of the aerial vehicle based on the maximum angle of ascent and/or adjusting thrust of the aerial vehicle 130 based on the maximum angle of ascent. In some examples, the adjusting thrust of the aerial vehicle 130 may involve using differential thrusting of one or more of the rotors 134A-D of the aerial vehicle 130.

As shown in FIG. 6B, at point 614 the aerial vehicle 130 may have a speed V61 and a pitch angle PA61; at point 618A the aerial vehicle 130 may have a speed V62 and a pitch angle PA62; and at point 618B the aerial vehicle 130 may have a speed V63 and a pitch angle PA63.

In some implementations, the angle of ascent AA2 may be selected before point 618A. With this arrangement, the pitch angle PA61 and/or the pitch angle PA62 may be selected based on the angle of ascent AA2. Further, in some examples, the pitch angle PA62 and the pitch angle PA63 may be equal to the pitch angle PA61. However, in other examples, the pitch angles PA61, PA62, and PA63 may be different than each other. For instance, PA61 may be greater or less than PA62 and/or PA63; PA62 may be greater or less than PA63 and/or PA61; and PA63 may be greater or less than PA61 and/or PA62. Further, PA63 may be selected and/or adjusted during the ascent. Further still, PA61 and/or PA62 may be adjusted during the ascent.

Moreover, in some implementations, the speed V61 and/or the speed V62 may be selected based on the angle of ascent AA2. Further, in some examples, the speed V62, and the speed V63 may be equal to the speed V61. However, in other examples, the speeds V61, V62, V63 may be different than each other. For example, the speed V63 may be less than the speed V62, and the speed V62 may be less than the speed V61. Further, speeds V61, V62, and V63 may be selected and/or adjusted during the ascent.

In some implementations, any of speeds V61, V62, and/or V64 may be a speed that corresponds with a minimum (or no) throttle of the aerial vehicle 130. Further, in some implementations, at the speed V62, the aerial vehicle 130 may ascend in a forward-flight orientation. Moreover, at the speed V62, the angle of ascent AA2 may be converged. As shown in FIG. 6B, the second location 620 may be in the air and substantially downwind of the ground station 110. The second location 620 may be oriented with respect to the ground station 110 a similar way as the first location 610 may be oriented with respect to the ground station 110.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 610 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis.

At one or more points 618, a tension of the tether 120 may increase during the ascent. For example, a tension of the tether 120 at point 618B may be greater than a tension of the tether at point 618A, and a tension of the tether at point 618A may be greater than a tension of the tether at point 614.

With this arrangement, a curvature of the tether 120 may decrease during the ascent. For example, a curvature the tether 120 at point 618B may be less than a curvature of the tether 120 at point 618A. Further, in some examples, a curvature of the tether 120 at point 618A may be less than a curvature of the tether 120 at point 614.

Moreover, in some examples, when the aerial vehicle 130 includes a GPS receiver, operating the aerial vehicle 130 in the forward-flight orientation to ascend at an angle of ascent may involve monitoring the ascent of the aerial vehicle with the GPS receiver. With such an arrangement, control of a trajectory of the aerial vehicle 130 during the ascent may be improved. As a result, the aerial vehicle 130's ability to follow one or more portions and/or portions of the path 616 may be improved.

Further, in some examples, when the aerial vehicle 130 includes at least one pitot tube, operating the aerial vehicle 130 in the forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle 130 during the ascent may be improved. As a result, the aerial vehicle's ability to follow one or more portions and/or points of the path 616 may be improved.

Moreover, as shown in FIG. 6B, at point 614 and point 618 a bottom of the tether 120 may be a predetermined altitude 624 above the ground 302. With this arrangement, at point 614 and point 618 the tether 120 may not touch the ground 302. In some examples, the predetermined altitude 624 may be less than the predetermined altitude 612. And the predetermined altitude 624 may be greater than, less than, and/or equal to the predetermined the predetermined altitude 324. In some implementations, the predetermined altitude 624 may be greater than one half of the height of the ground station 110. And in at least one such implementation, the predetermined altitude 624 may be 6 meters.

Example 600 continues at a point 622 with transitioning the aerial vehicle 130 from the forward-flight orientation to a hover-flight orientation. In some examples, transitioning the aerial vehicle 130 from the forward-flight orientation to the hover-flight orientation may involve a flight maneuver. Further, transitioning the aerial vehicle 130 from the forward-flight orientation to the hover-flight orientation may occur when the aerial vehicle 130 has a threshold speed, such as 15 m/s. In some implementations, transitioning the aerial vehicle 130 from the forward-flight orientation to the hover-flight orientation may occur when the speed V63 is 15 m/s. Further, at point 622, a tension of the tether 120 may be greater than a tension of the tether at point 618B.

During the transition from the forward-flight orientation to the hover-flight orientation, the aerial vehicle 130 may be positioned at third location 624 (In some examples, the third location 624 may be referred to as a fifth location). As shown in FIG. 6C, the third location 624 may be in the air and substantially downwind of the ground station 110. In some implementations, the third location 624 could be the same as or similar to the second location 620. When the third location 624 is not substantially on the tether sphere 304, after point 622 the aerial vehicle 130 may be blown by the wind to a fourth location (not shown) that is substantially on the tether sphere 304.

Moreover, as shown in FIG. 6C, at point 622 a bottom of the tether 120 may be a predetermined altitude 626 above the ground 302. With this arrangement, at point 626 the tether 120 may not touch the ground 302. In some examples, the predetermined altitude 626 may be greater than the predetermined altitude 612 and/or the predetermined altitude 624.

Thus, example 600 may be carried out so that the tether 120 may not contact the ground 602. With such an arrangement, the mechanical integrity of the tether 120 may be improved. For example, the tether 120 might not catch on (or tangle around) objects located on the ground 302. As another example, when the tether sphere 304 is located above a body of water described herein, the tether 120 might not be submersed in the water. In addition, with such an arrangement, safety of one or more people located near the ground station 110 (e.g., within the portion 304A of the tether sphere 304) may be improved.

In addition, example 600 may be carried out so that a bottom of the tether 120 remains above the predetermined altitude 624. With such an arrangement, the mechanical integrity of the tether 120 may be improved as described herein and/or safety of one or more people located near the ground station may be improved.

Moreover, one or more actions that correspond with points 606-622 may be performed at various different time periods in various different embodiments. For instance, the one or more actions that correspond with point 606 may be performed at a first time period, the one or more actions that correspond with point 608 may be performed at a second time period, the one or more actions that correspond with point 614 may be performed at a third time period, the one or more actions that correspond with point 618A may be performed at a fourth time period, the one or more actions that correspond with point 618B may be performed at a fifth time period, and the one or more actions that correspond with point 622 may be performed at a seventh time period. However, in other examples, at least some of the actions of the one or more actions that correspond with points 606-622 may be performed concurrently.

Although example 600 has been described above with reference to FIGS. 6A-C, in accordance with this disclosure, point 608 and point 622 may occur at various locations that are substantially on the portion 304A of the tether sphere 304, and point 614 and one or more points 618 may occur at various locations that are inside the portion 304A of the tether sphere.

III. REDUCING OSCILLATION IN FLOATING GROUND STATIONS

Figure 7:
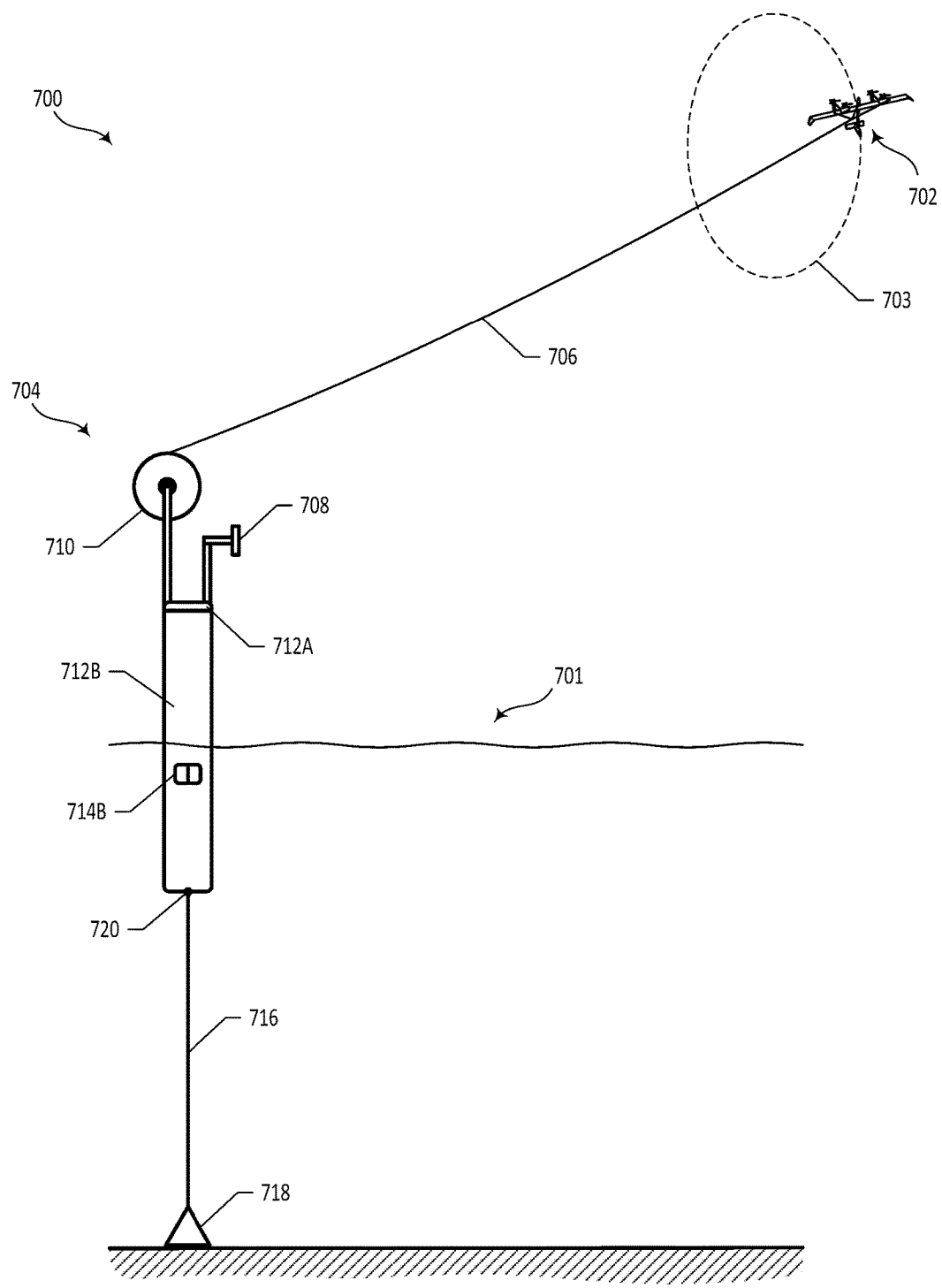
FIG. 7 depicts a side view of an airborne wind turbine system with a moored floating ground station, according to an example embodiment.

FIG. 7 depicts a side view of an airborne wind turbine system 700 with a moored floating ground station 704 partially submerged beneath a water surface 701, according to an example embodiment. As illustrated, the ground station 704 is in a quiescent state with no substantial oscillation as a result of wave-induced motion. Ground station 704 includes a top platform 712A and a spar buoy 712B that may rotate independently of each other. The ground station 704 may be similar to, perform similarly to, and/or include components described with respect to, other ground stations described herein, for example, ground station 100. An aerial vehicle 702, shown here in crosswind flight about path 703, is coupled to a winch drum 710 via tether 706. The winch drum 710 is mounted to the top platform 712A. Tether 706 may be similar to, perform similarly to, and/or include components described with respect to, other tethers described herein, for example, tether 120. Tether 706 preferably contains one or more electrical conductors and data pathways linking the aerial vehicle 702 to the ground station 704. The winch drum 710 may be used to take up or payout the tether 706, particularly during landing or takeoff. Alternatively or additionally, other tether take up or payout apparatuses may be present, including but not limited to, internal reels or submersion systems. As illustrated, the ground station 704 is coupled to a single aerial vehicle 702; however, in another embodiment, more than one aerial vehicle may be coupled to a single ground station 704.

A perch 708 is coupled to the top platform 712A and may be used to directly couple the aerial vehicle 702 to the ground station 704 when the aerial vehicle 702 is landed. The top platform 712A may rotate to help align the aerial vehicle 702 during takeoff, landing, and/or crosswind flight. For example, it may be desirable to align the perch 708 and/or aerial vehicle 702 in a downwind position, or in a position relative to wave direction, or in a position based on a combination of wind and wave direction.

The ground station 704 is moored to a mooring 718 via a mooring line 716. The spar buoy 712B may have a rotational couple with the mooring line 716 in one or more axis at interface 720. As illustrated, the ground station 704 is anchored in a tension leg configuration via the single mooring line 716; however, other configurations in other embodiments are also possible. For example, one or more mooring lines may anchor the ground station 704 at interface 720 or at another rotational couple location along the body of the spar buoy 712B. Alternatively, the ground station 704 may utilize a floating platform configuration other than a spar buoy 712B.

Submerged thrusters 714B and 714A (714A not visible in this view) are mounted below the water surface 701 on opposing sides of the spar buoy 712B. Preferably, submerged thrusters 714A-B may independently employ forward or reverse thrust.

Figure 8:
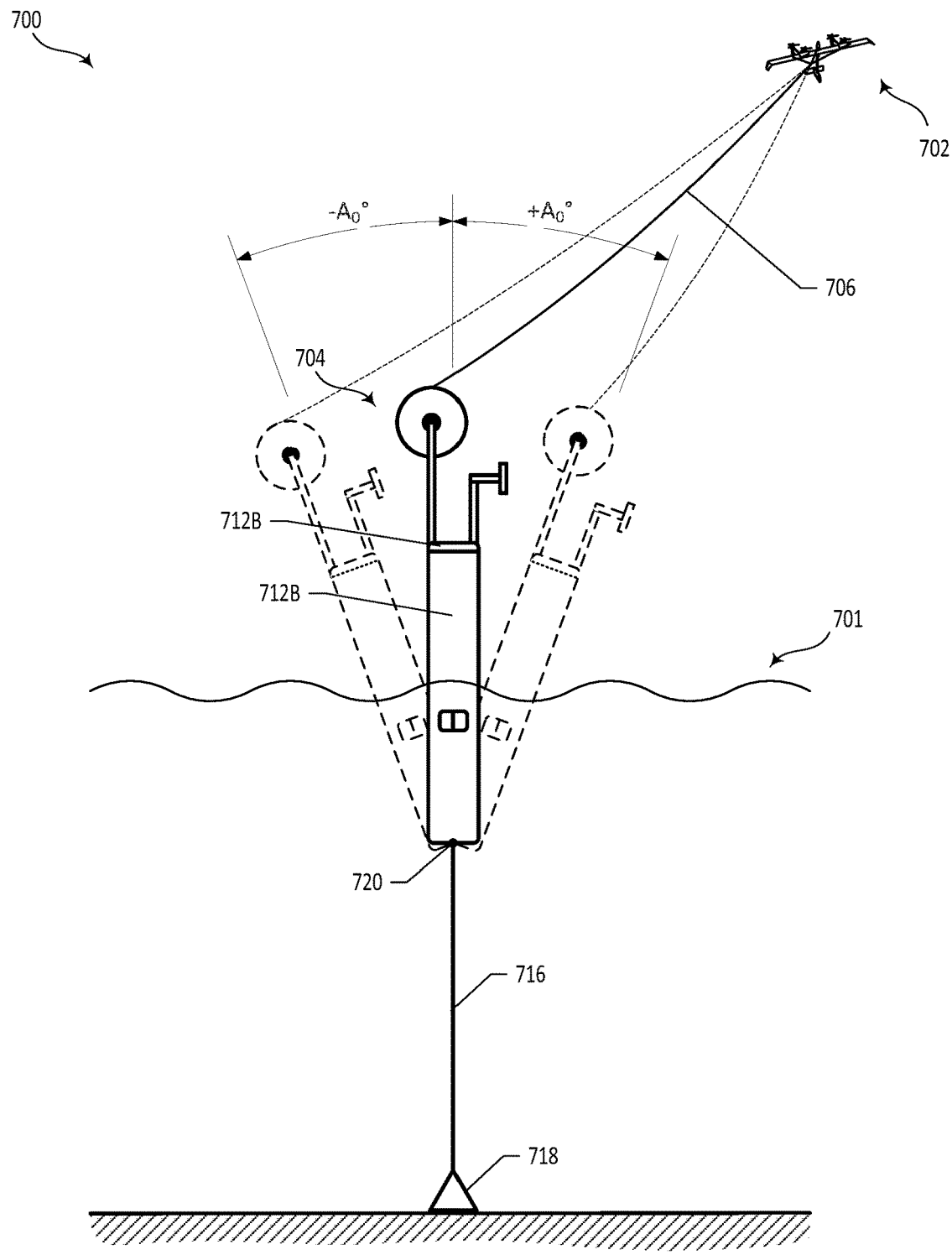
FIG. 8 depicts a side view of an airborne wind turbine system with an oscillating ground station, according to an example embodiment.

FIG. 8 depicts a side view of the airborne wind turbine system 700 where the ground station 704 is in an oscillatory state as a result of wave-induced motion. As illustrated for clarity, the wave-induced oscillation may be primarily about the rotational couple at the interface 720. However, depending on the configuration of the system 700, the wave-induced oscillation may alternatively or additionally be about mooring 718. The oscillation is depicted with a total amplitude of $2*A_O$ degrees. Amplitude may be also be considered in terms of distance displacement instead of degrees of displacement. For simplicity of illustration, the oscillation of ground station 704 is depicted as symmetrical about a vertical axis; however, the oscillation may be about a tilted axis, for example where a tension force from the tether 706 is acting on the ground station 704.

Ground station 704 may include environmental and/or positional sensors that can provide quantitative and/or qualitative data about wind direction, wave direction, orientation of the ground station 704 and/or platform 712A with respect to the wind and/or wave direction, ground station 704 tilt, amplitude of oscillation of the entire ground station 704 and/or one or more positions on the ground station 704, frequency of oscillation (e.g., oscillations per unit time), direction of oscillation in an absolute direction (e.g., compass direction) or relative direction to wave, wind, or aerial vehicle direction, and/or wave periodicity, including swell period, wind-wave period, and/or dominant period where the kinetic energy is at a maximum (i.e., peak period), or some combination thereof. As non-limiting examples, the ground station 704 may utilize anemometers, wind vanes, mechanical wind sensors, ultrasonic wind sensors, radar, acoustic wave sensors, pressure-based wave sensors, gyroscopic sensors, and/or inertial measurement units (IMUs).

Figure 9:
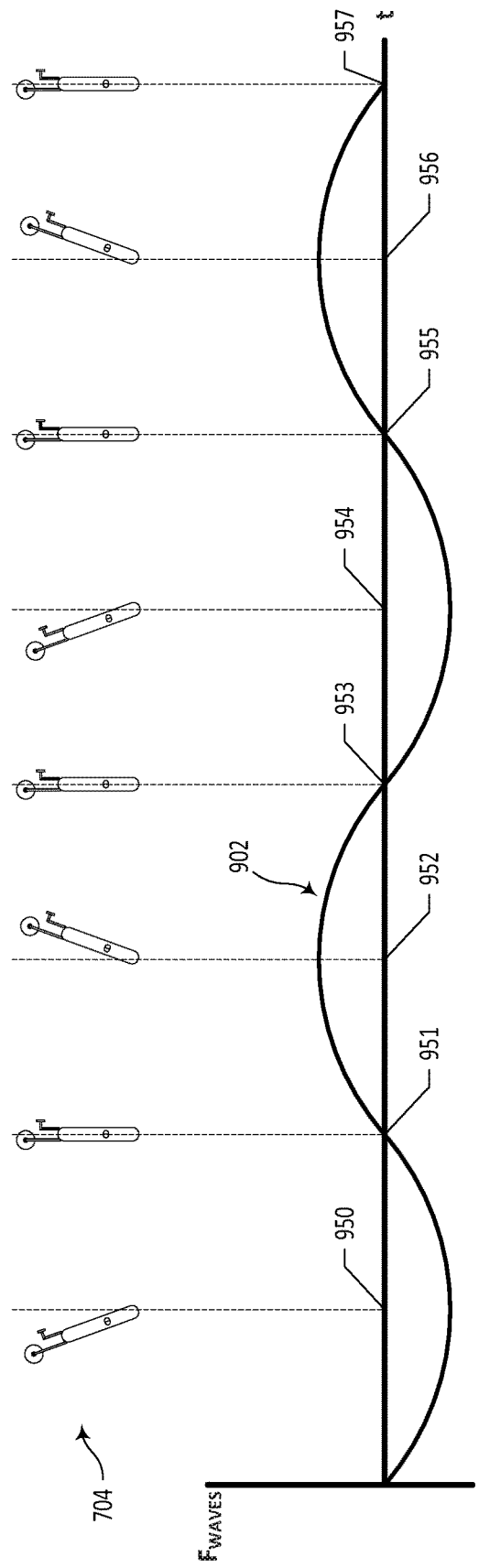
FIG. 9 depicts a chart of wave force over time overlaid with a representation of ground station oscillation.

FIG. 9 depicts a simplified example chart of wave force over time (902) with an overlaid representation of ground station 704 oscillation. The vertical axis indicates wave force ($F_{WAVES}$) on ground station 704 in the direction of wave travel. Values above the horizontal axis indicate wave force causing displacement of the top of the ground station 704 in the direction of wave travel, referred to herein as forward displacement. Values below the horizontal axis indicate wave force causing displacement of the top of the ground station 704 in the direction opposite of wave travel, referred to herein as backward displacement. The horizontal axis indicates time (t). In a typical system 700, a complete oscillation (travel of the ground station 704 through maximum amplitude) may take on the order of, for example, 3 seconds to 30 seconds.

In this example illustration, at positions 950 and 954, the wave force 902 acting on the ground station 704 is at a local maximum in the direction opposite of wave travel, and ground station 704 is represented at maximum backward displacement. At positions 951, 953, 955, and 957, the wave force 902 acting on the ground station 704 is at a local minimum in the direction of wave travel, and ground station 704 is represented at zero amplitude displacement from a nominal position. At positions 952 and 956, the wave force 902 acting on the ground station 704 is at a local maximum in the direction of wave travel, and ground station 704 is represented at maximum forward displacement.

In this simplified example, maximum displacement of the ground station 704 is represented as occurring at local maximums of the wave force 902. However, depending on the configuration of the aerial wind turbine system, maximum displacement of the ground station 704 oscillation may lag behind the local wave force 902 maximums. Regardless of lag, the period (or frequency) of ground station 704 oscillation will generally match or correspond to a period (or frequency) of the wave force 902 acting on the ground station 704, such as the swell period, wind-wave period, and/or dominant period where the kinetic energy is at a maximum (i.e., peak period), or some combination thereof. Additionally, in this simplified example, the nominal position of ground station 704 at zero amplitude displacement at positions 951, 953, 955, and 957 is represented as vertical. However, as discussed above, the nominal position may be tilted, along with a corresponding tilt of the maximum displacement positions of the ground station 704.

Figure 10:
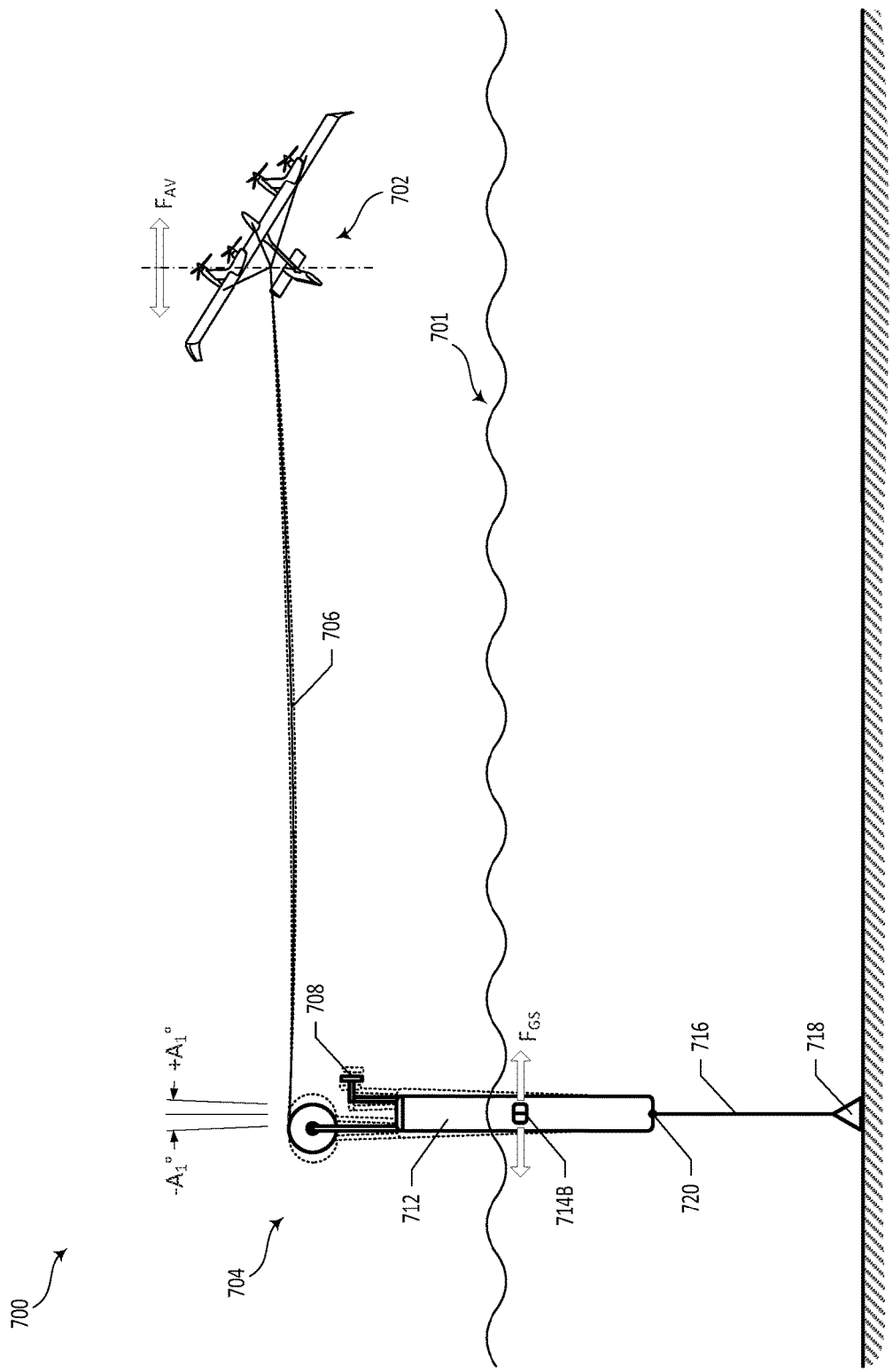
FIG. 10 depicts a side view of an airborne wind turbine system with reduced oscillation as a result of application of compensatory force, according to an example embodiment.

FIG. 10 depicts a side view of an airborne wind turbine system 700 with reduced oscillation as a result of the application of a compensatory force. In one embodiment, the aerial vehicle 702 uses its rotors (e.g., rotors such as rotors 134A-D) to apply a compensatory force ($F_{AV}$) via the tether 706 to the ground station 704. The compensatory force $F_{AV}$ may be applied in varying amounts over time and in opposition to the varying wave force over time (e.g., 902). As the wave force 902 causes forward displacement of the ground station 704, the aerial vehicle will apply less or no compensatory force $F_{AV}$, or a counteracting compensatory force $F_{AV}$, depending on the stiffness of the tether and distance from the ground station 704. As the wave force 902 causes backward displacement of the ground station 704, the aerial vehicle will apply more compensatory force $F_{AV}$. The compensatory force $F_{AV}$ may be in addition to a tension force that the aerial vehicle 706 is applying to ground station 704 via the tether 7006. Depending on environmental and positional conditions and configuration of the airborne wind turbine system 700, the aerial vehicle 706 may move towards or away from the ground station as it applies the compensatory force $F_{AV}$. As a result of the compensatory force $F_{AV}$, the ground station 704 exhibits a lower amplitude of oscillation compared to a system without compensatory force, depicted here as $2*A_1°$, where $(2*A_1°)<(2*A_0°)$.

In another embodiment, the ground station 704 uses its submerged thrusters 714B and 714A (not visible in this view) to apply a compensatory force ($F_{GS}$) to the ground station 704. Similar to the compensatory force $F_{AV}$, the compensatory force $F_{GS}$ may be applied in varying amounts over time and in opposition to the varying wave force over time (e.g., 902). As the wave force 902 causes forward displacement of the ground station 704, the submerged thrusters 714A-B will apply an opposing compensatory force $F_{GS}$ (to the left in this FIG. 10 view) to the ground station 704. As the wave force 902 causes backward displacement of the ground station 704, the submerged thrusters 714A-B will apply an opposing compensatory force $F_{GS}$ (to the right this FIG. 10 view) to the ground station 704. As with the compensatory force $F_{AV}$, the ground station 704 exhibits a lower amplitude of oscillation as a result of the compensatory force $F_{GS}$, as compared to a system without a compensatory force.

In another embodiment, the aerial vehicle 702 and the submerged thrusters 714A-B may both apply compensatory force to the ground station 704. For example, the aerial vehicle 702 may apply the compensatory force $F_{AV}$, and the submerged thrusters 714A-B may apply the additional compensatory force $F_{GS}$. The compensatory forces $F_{AV}$ and $F_{GS}$ may be applied sequentially, or together, or in any combination.

In another embodiment (not shown), the aerial vehicle 702 may be landed and directly coupled to the ground station 704 at the perch 708. In this embodiment, the compensatory force $F_{AV}$ would act directly on the ground station 704 instead of through the tether 706.

For simplicity, the amplitude of oscillation $2*A_1°$ is depicted as symmetrical about a vertical axis; however, the amplitude of oscillation may be asymmetric and/or about a tilted axis. For example, the compensatory force $F_{AV}$ may reduce backward displacement more than forward displacement (or vice-versa) and/or the ground station 704 may be tilted as a result of tension in the tether 706 and/or wind effects.

FIGS. 11A-C depict charts of wave force over time overlaid with compensatory force over time. As in the chart in FIG. 9, the left vertical axes indicates wave force ($F_{WAVES}$) on ground station 704 in the direction of wave travel. Values above the horizontal axis indicate force causing forward displacement. Values below the horizontal axis indicate force causing backward displacement. The horizontal axis indicates time (t).

In FIG. 11A, a graph of aerial vehicle compensatory force $F_{AV}$ over time (904A) is overlaid with the wave force over time (902), as in FIG. 9. The right vertical axis indicates compensatory force $F_{AV}$ on the ground station 704 in the direction of wave travel. For purposes herein, the scale of the left and right vertical axes may be considered the same if $F_{AV}$ is measured at the same location as $F_{WAVE}$.

In this example illustration, at position 950, where the wave force 902 acting on the ground station 704 is at a local maximum in the direction opposite of wave travel, the aerial vehicle 702 is applying a compensatory force 904A in opposition to the wave force 902 and of similar or identical magnitude. The net effect on the ground station 704 is a substantial cancellation of the wave force 902 at that moment in time and therefore a reduced or eliminated oscillation effect. Similarly, at positions 951 and 953, where the wave force 902 acting on the ground station 704 is at a local minimum in the direction of wave travel, the aerial vehicle 702 is applying a compensatory force 904A in opposition to the wave force 902 and of similar or identical magnitude, and that compensatory force 904A may be effectively zero force. At position 950, where the wave force 902 acting on the ground station 704 is at a local maximum in the direction of wave travel, the aerial vehicle 702 is applying a compensatory force 904A in opposition to the wave force 902 and of similar or identical magnitude. The net effect on the ground station 704 is a substantial cancellation of the wave force 902 at that moment in time and therefore a reduced or eliminated oscillation effect. In all cases, it is understood that the compensatory force $F_{AV}$ over time (904A) may be in addition to other tether tension forces acting between the aerial vehicle 702 and the ground station 704.

In FIG. 11B, a graph of ground station compensatory force $F_{GS}$ over time (906A) is overlaid with the wave force over time (902), as in FIG. 9 and in FIG. 11A. The right vertical axis indicates compensatory force $F_{GS}$ on the ground station 704 in the direction of wave travel. For purposes herein, the scale of the left and right vertical axes may be considered the same if $F_{GS}$ is measured at the same location as $F_{WAVE}$. At each point 950-953, the compensatory force 906A acts on the ground station 704 in opposition to the wave force 902 and in the same manner as described above with respect to compensatory force 904A.

In FIG. 11C, a graph of the aerial vehicle compensatory force $F_{AV}$ over time (904B), the ground station compensatory force $F_{GS}$ over time (906B), and a resulting compensatory force $F_{AV+GS}$ over time (908) is overlaid with the wave force over time (902), similar to FIGS. 9, 11A, and 11B. The right vertical axis indicates resulting compensatory force $F_{AV+GS}$ on the ground station 704 in the direction of wave travel. For purposes herein, the scale of the left and right vertical axes may be considered the same if $F_{AV+GS}$ is measured at the same location as $F_{WAVE}$. To the extent that compensatory forces 904B and 906B are in phase with each other, as illustrated here, the compensatory forces 904B and 906B will reinforce each other. At each point 950-953, the resulting compensatory force 908 acts on the ground station 704 in opposition to the wave force 902 and in the same manner as described above with respect to compensatory forces 904A and 906A.

Figure 12:
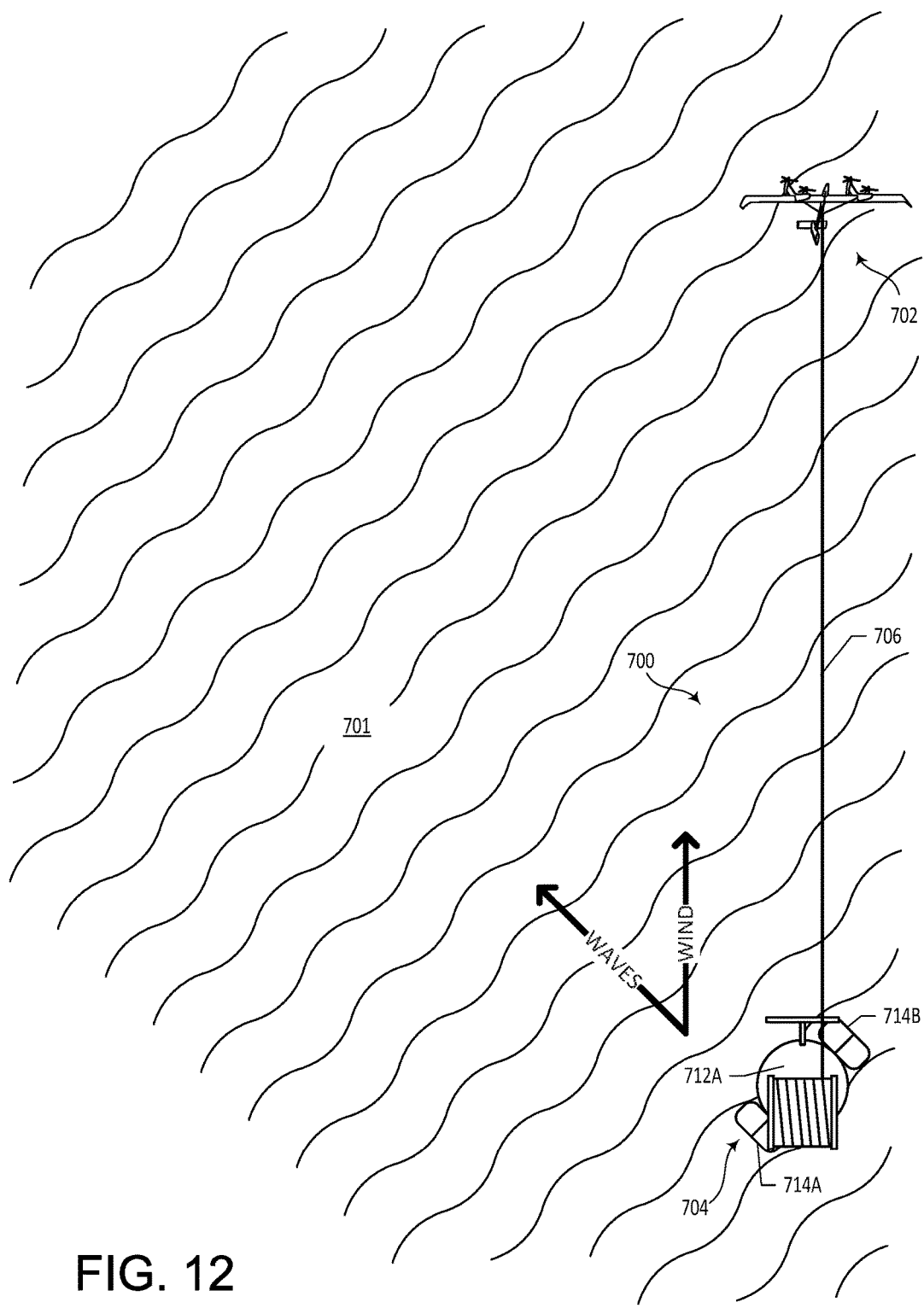
FIG. 12 depicts a top view of an offshore airborne wind turbine system, according to an example embodiment.

FIG. 12 depicts a top view of the offshore airborne wind turbine system 700, according to an example embodiment. FIG. 12 illustrates an environmental condition in which the wave direction is not the same as the wind direction. It is generally preferable to have the aerial vehicle 702 fly directly downwind of the ground station 704. However, that may result in a condition where the submerged thrusters 714A-B are not aligned with the direction of wave travel and may be less effective in counteracting wave-induced oscillation. In such circumstances, the submerged thrusters 714A-B may be operated to rotate the ground station 704 to align the thrust force from the submerged thrusters 714A-B with the wave direction. Because top platform 712A is independently rotatable from the spar buoy 712B, the top platform 712A may move or remain aligned with the aerial vehicle. For example, as illustrated in FIG. 12, the top platform 712A may counter-rotate against the spar buoy 712B so that a winding direction of the winch drum 710 is aligned with the direction in which the aerial vehicle 702 is flying.

Figure 13A:
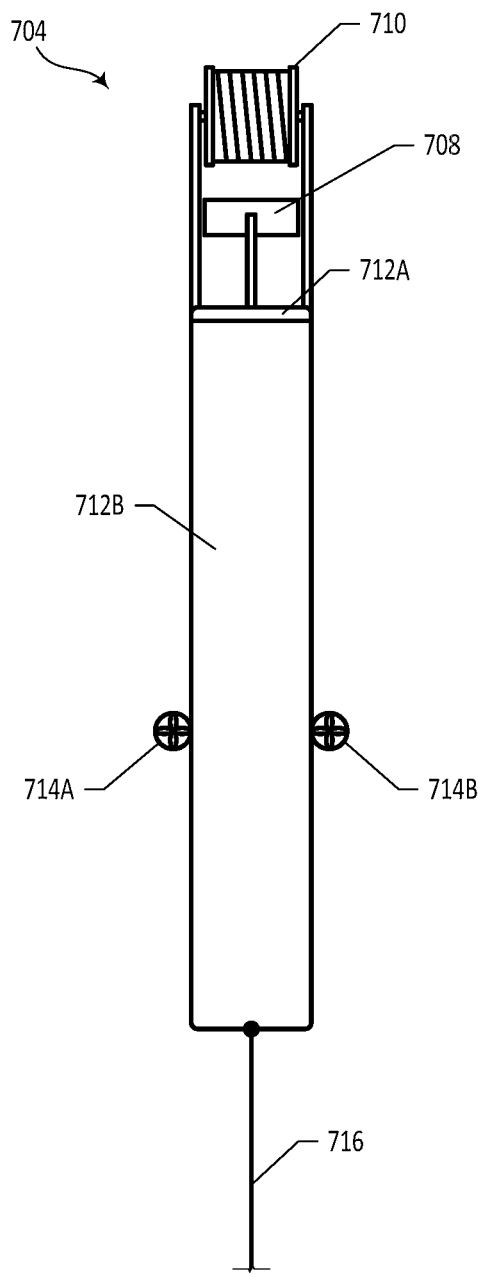
FIG. 13A depicts a side view of a floating ground station of an aerial wind turbine system, according to an example embodiment.
Figure 13B:
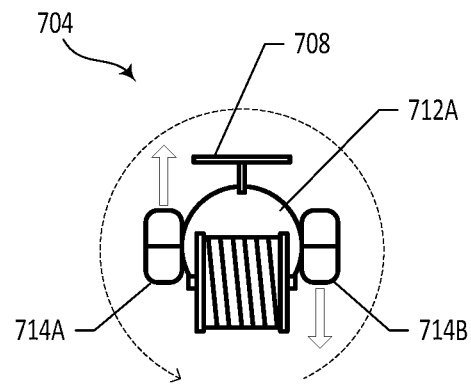
FIGS. 13B-C depict a top view of the floating ground station of FIG. 13A.
Figure 13C:
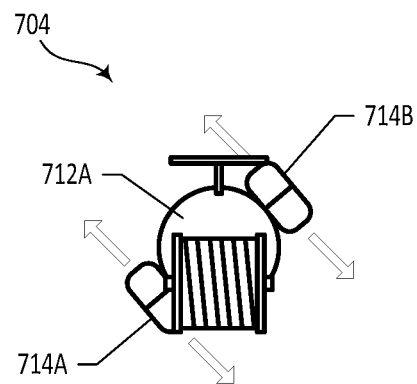

FIG. 13A depicts a side view of the floating ground station 704 of the aerial wind turbine system 700, according to an example embodiment. FIGS. 13B and 13C depict top views of the same. In FIGS. 13A-C, submerged thrusters 714A-B can be seen mounted on opposing sides of the ground station 704. Preferably, each of the submerged thrusters 714A-B can operate in a forward and a reverse direction. Operating the submerged thrusters 714A-B in opposing directions imparts a rotational force on the ground station 704, as can be seen FIG. 13B. Operating both submerged thrusters 714A-B in the same direction imparts a compensatory force $F_{GS}$ on the ground station 704, as can be seen in FIG. 13C. FIG. 13C further depicts a view of the ground station 704 after rotation by the submerged thrusters 714A-B but with a rotated top platform 712A.

Figure 14A:
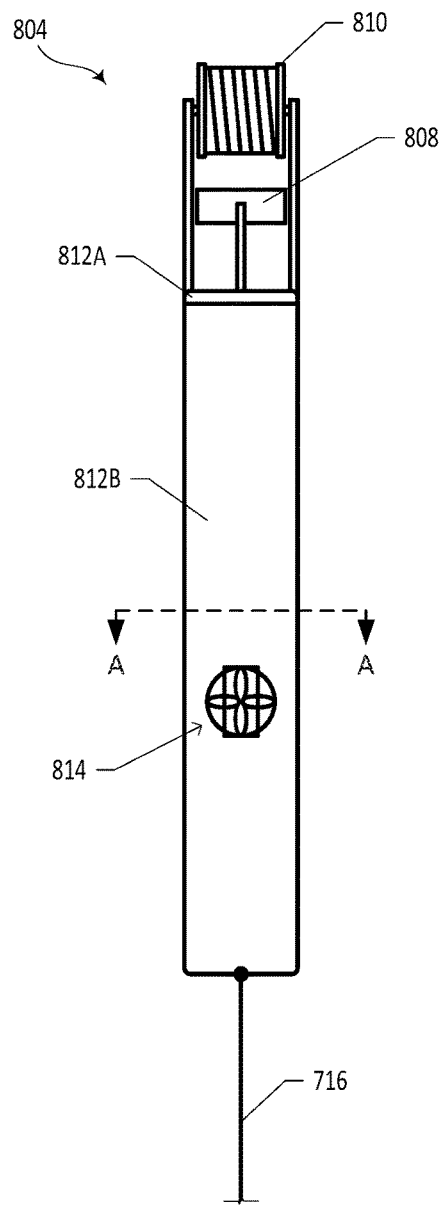
FIG. 14A depicts a side view of a floating ground station of an aerial wind turbine system, according to an example embodiment.
Figure 14B:
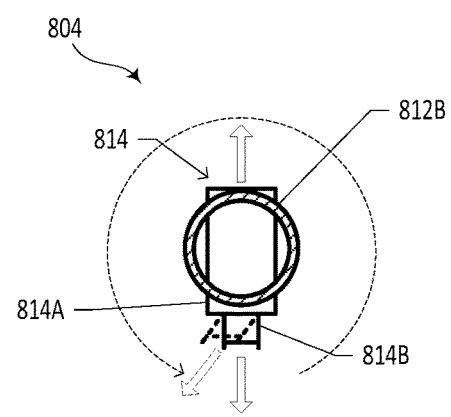
FIG. 14B depicts a top view of the floating ground station of FIG. 14A.

FIG. 14A depicts a side view of a floating ground station 804 useable in an aerial wind turbine system such as system 700, according to an example embodiment. Ground station 804 includes a spar buoy 812B, a rotating top platform 812A, a perch 808, and a winch drum 810, similar to or the same as components depicted in ground station 704. Instead of using multiple submerged thrusters 714A-B, ground station 804 includes a vectored thruster 814 with a directional nozzle 814B. As can be seen in the cross-sectional view A-A in FIG. 14B, the directional nozzle 814B can move independently of the vectored thruster body 814A. By moving the directional nozzle 814B and activating the vectored thruster 814, a rotational force can be imparted to the ground station 804.

Figure 15:
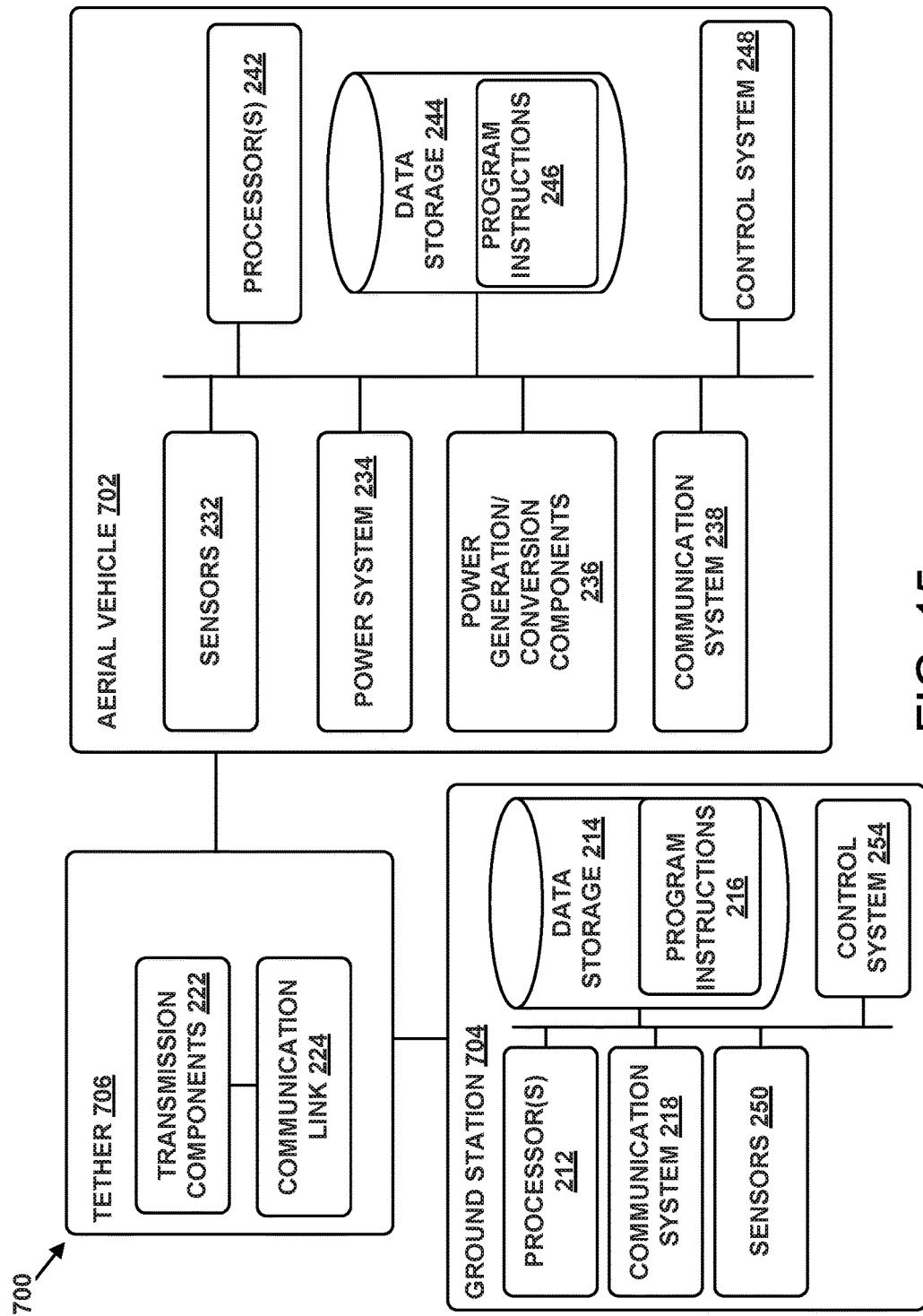
FIG. 15 is a simplified block diagram illustrating components of an AWT, according to an example embodiment.

FIG. 15 is a simplified block diagram illustrating components of the AWT system 700. As previously described, the AWT system 700 may take the form of or be similar in form to the AWT 100. In particular, the AWT system 700 includes the ground station 704, the tether 706, and the aerial vehicle 702. The AWT system 700 depicted in FIG. 15 includes the components described with respect FIG. 2, and some additional components.

As previously described, the ground station 704 may include various sensors 250, including positional and environmental sensor. For example, the sensors 250 may include a global positioning system (GPS) receiver. The GPS receiver may be configured to provide data that is typical of well-known GPS systems (which may be referred to as a global navigation satellite system (GNSS)), such as the GPS coordinates of the ground station 704. Such GPS data may be utilized by the AWT system 700 to provide various functions described herein.

As another example, the sensors 250 may include one or more wind sensors, such as anemometers, wind vanes, mechanical wind sensors, and/or ultrasonic wind sensors. The one or more wind sensors may be configured to determine wind speed and/or direction. Such wind data may be utilized by the AWT system 700 to provide various functions described herein.

Still as another example, the sensors 250 may include one or more inertial measurement units (IMUs). An IMU may include both an accelerometer and a gyroscope, which may be used together to determine the orientation of the ground station 704. In particular, the accelerometer can measure the orientation of the ground station 704 with respect to earth, while the gyroscope can measure the rate of oscillation. The IMU may include other sensors, in addition to accelerometers and gyroscopes, which may help to better determine position, such as a 3-axis magnetometers. The sensors 250 may also include wave sensors such as, but not limited to, radar wave sensors, acoustic wave sensors, pressure-based wave sensors, and gyroscopic sensors.

The ground station 704 may include a control system 254. In some implementations, the control system 254 may be configured to perform one or more functions described herein. For example, the control system 254 may be configured to determine an oscillation profile of ground station 704, where the profile includes one or more of a direction, period and/or frequency, and an amplitude of oscillation. The control system 254 may be configured to determine a compensatory force to apply to the ground station to reduce or substantially eliminate the amplitude of oscillation. The control system may direct the application of the compensatory force and may determine a predictive force profile that determines a varying amount of compensatory force to be applied as a function of time. The application of the compensatory force may vary over time in a periodic pattern. For example, the compensatory force may vary in opposite phase to periodic wave force on the ground station 704. As specific non-limiting examples, the compensatory force may vary in opposite phase to the swell period, wind-wave period, and/or dominant period where the kinetic energy is at a maximum (i.e., peak period), or some combination thereof. The control system 254 may direct the aerial vehicle 702, the submerged thruster(s) 714A-B, or a combination thereof, to apply the compensatory force.

The control system 254 may be configured to determine the direction the ground station 704 is oscillating in and to further cause the thrusters 714A-B to rotate the ground station 704 so that a direction of thrust from the thrusters 714A-B is aligned with the oscillation direction. The control system 254 may direct cause the top platform 714A to rotate. Additionally, control system 254 may be able to control the winch drum 710 and to direct the winch drum 710 to reel in or payout the tether 706.

The control system 254 may be implemented with mechanical systems and/or with hardware, firmware, and/or software. As one example, the control system 254 may take the form of program instructions stored on a non-transitory computer readable medium and a processor that executes the instructions. The control system 254 may be implemented in whole or in part on the ground station 704. Alternatively, control systems 248 and 254 may be considered a single control system, that performs in a manner as described with respect to control systems 248 and 254. Generally, the manner in which a control system, such as control systems 248, 254 or a combination thereof, is implemented may vary, depending upon the particular application.

Figure 16:
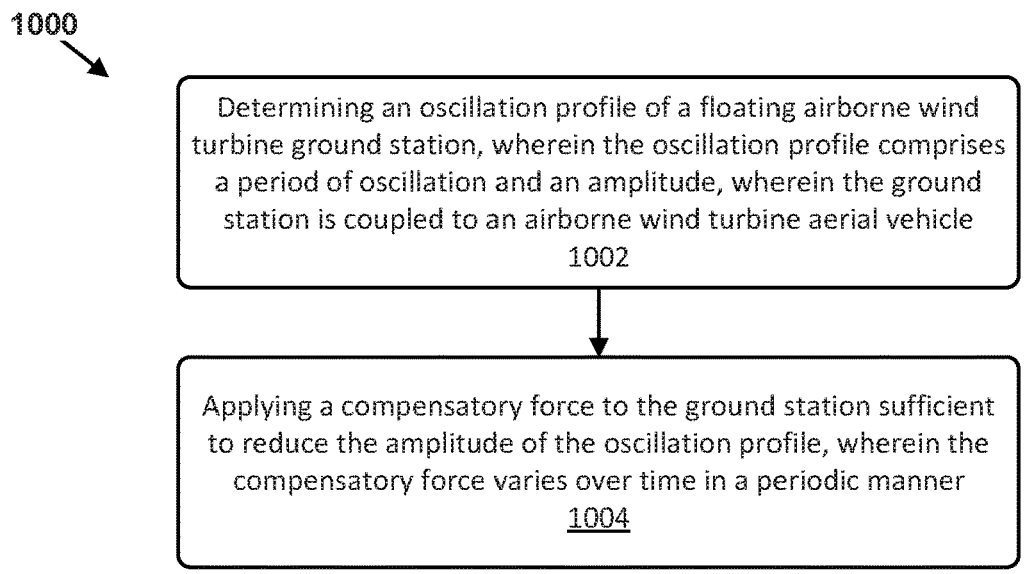
FIG. 16 depicts a simplified diagram of a method according to an example embodiment.

FIG. 16 depicts a simplified diagram of method 1000 according to an example embodiment. Method 1000 can be implemented in the systems described herein. Step 1002 includes determining an oscillation profile of a floating airborne wind turbine ground station, wherein the oscillation profile comprises a period of oscillation and an amplitude, wherein the ground station is coupled to an airborne wind turbine aerial vehicle. In some embodiments, the period of oscillation may match, be derived from, and/or correlate to, swell period, wind-wave period, and/or dominant period where the kinetic energy is at a maximum (i.e., peak period), or some combination thereof. Step 1004 includes applying a compensatory force to the ground station sufficient to reduce the amplitude of the oscillation profile, wherein the compensatory force varies over time in a periodic manner. As specific non-limiting examples, the compensatory force may vary in opposite phase to the swell period, wind-wave period, and/or dominant period where the kinetic energy is at a maximum (i.e., peak period), or some combination thereof.

Figure 17:
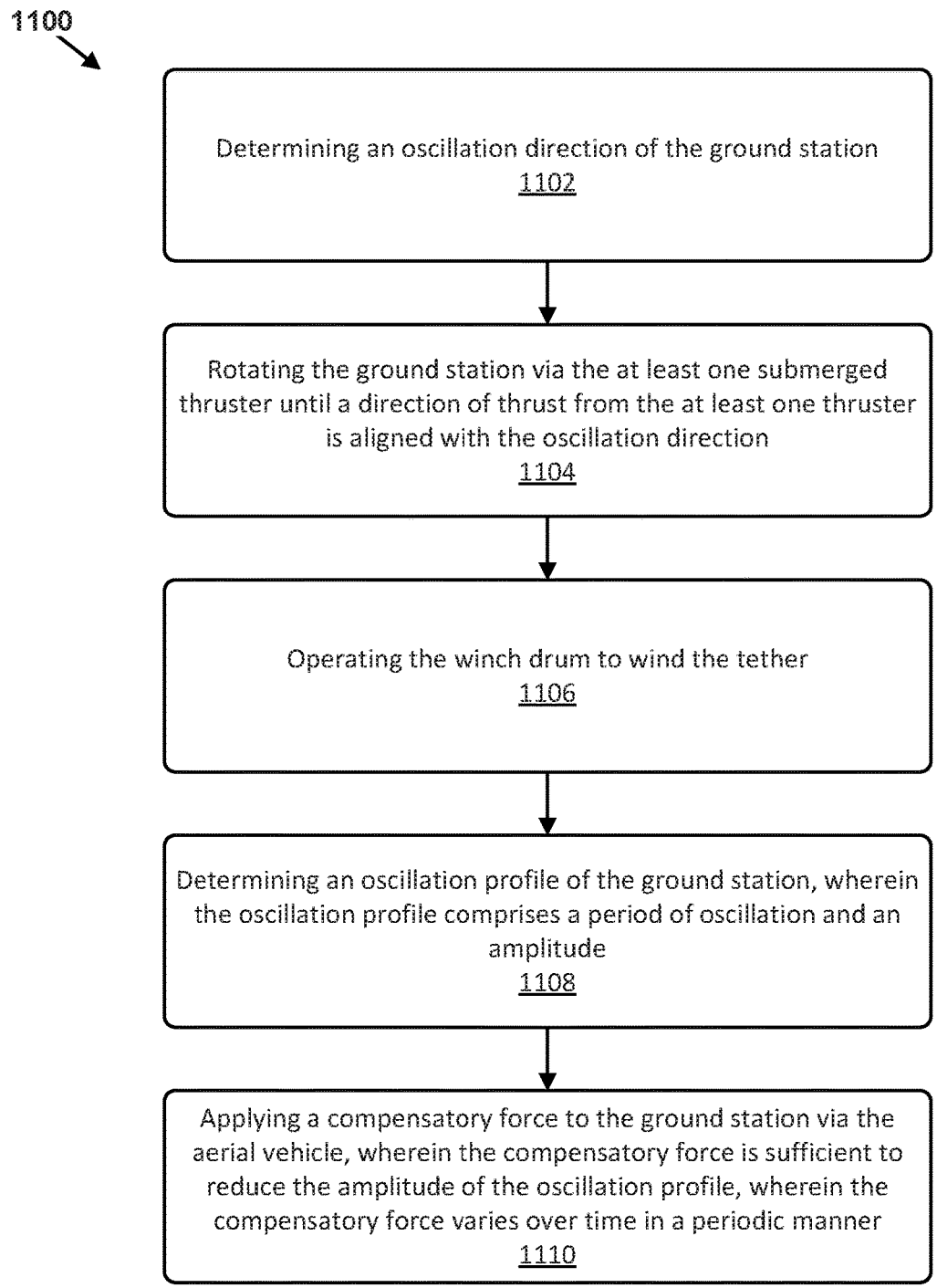
FIG. 17 depicts a simplified diagram of a method of landing an aerial vehicle according to an example embodiment.

FIG. 17 depicts a simplified diagram of method 1100 of landing an aerial vehicle according to an example embodiment. Method 1100 can be implemented in the systems described herein. In particular, method 1100 can be implemented in an airborne wind turbine system comprising an aerial vehicle, a floating ground station, at least one submerged thruster coupled to the ground station, a tether coupling the aerial vehicle to the ground station, and a winch drum coupled to the ground station and configured to wind the tether. Step 1102 includes determining an oscillation direction of the ground station. Step 1104 includes rotating the ground station via the at least one submerged thruster until a direction of thrust from the at least one thruster is aligned with the oscillation direction. Step 1106 includes operating the winch drum to wind the tether. Step 1108 includes determining an oscillation profile of the ground station, wherein the oscillation profile comprises a period of oscillation and an amplitude. In some embodiments, the period of oscillation may match, be derived from, and/or correlate to, swell period, wind-wave period, and/or dominant period where the kinetic energy is at a maximum (i.e., peak period), or some combination thereof. Step 1110 includes applying a compensatory force to the ground station via the aerial vehicle, wherein the compensatory force is sufficient to reduce the amplitude of the oscillation profile, and wherein the compensatory force varies over time in a periodic manner. As specific non-limiting examples, the compensatory force may vary in opposite phase to the swell period, wind-wave period, and/or dominant period where the kinetic energy is at a maximum (i.e., peak period), or some combination thereof.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method comprising:
    determining an oscillation profile of a floating airborne wind turbine ground station, wherein the oscillation profile comprises a period of oscillation and an amplitude, wherein the ground station is coupled to an airborne wind turbine aerial vehicle; and
    applying a compensatory force to the ground station sufficient to reduce the amplitude of the oscillation profile, wherein the compensatory force varies over time in a periodic manner.

2. The method of claim 1, wherein the aerial vehicle applies the compensatory force to the ground station.

3. The method of claim 2, wherein the aerial vehicle is coupled to the ground station via a tether, and wherein the aerial vehicle applies the compensatory force to the ground station via the tether.

4. The method of claim 1, wherein the ground station comprises at least one submerged thruster, wherein the at least one submerged thruster applies the compensatory force to the ground station.

5. The method of claim 1, wherein the aerial vehicle is coupled to the ground station via a tether, wherein the ground station comprises at least one submerged thruster, and wherein the aerial vehicle and the at least one submerged thruster, in combination, apply the compensatory force to the ground station.

6. The method of claim 1, wherein the ground station comprises at least one submerged thruster, the method further comprising:
    determining an oscillation direction of the ground station;
    rotating the ground station via the at least one submerged thruster until a direction of thrust from the at least one thruster is aligned with the oscillation direction.

7. The method of claim 6, wherein the at least one submerged thruster comprises a directional nozzle, wherein rotating the ground station comprises moving the directional nozzle.

8. The method of claim 6, wherein the at least one submerged thruster comprises at least two submerged thrusters disposed on opposing sides of the ground station, wherein rotating the ground station comprises operating the at least two submerged thrusters with opposing directions of thrust.

9. The method of claim 1, further comprising:
    determining a predictive force profile based at least in part on the oscillation profile, wherein the predictive force profile comprises a varying compensatory force as a function of time, and
    wherein applying the compensatory force to the ground station comprises applying the compensatory force in accordance with the predictive force profile.

10. A method of landing an aerial vehicle in an airborne wind turbine system comprising an aerial vehicle, a floating ground station configured to receive the aerial vehicle, at least one submerged thruster coupled to the ground station, a tether coupling the aerial vehicle to the ground station, and a winch drum coupled to the ground station and configured to wind the tether, comprising the steps of:

determining an oscillation direction of the ground station;

rotating the ground station via the at least one submerged thruster until a direction of thrust from the at least one thruster is aligned with the oscillation direction;

operating the winch drum to wind the tether;

determining an oscillation profile of the ground station, wherein the oscillation profile comprises a period of oscillation and an amplitude; and applying a compensatory force to the ground station via the aerial vehicle, wherein the compensatory force is sufficient to reduce the amplitude of the oscillation profile, and wherein the compensatory force varies over time in a periodic manner.

11. The method of claim 10 further comprising:

determining a predictive force profile based at least in part on the oscillation profile, wherein the predictive force profile comprises a varying compensatory force as a function of time, and wherein applying the compensatory force to the ground station comprises applying the compensatory force in accordance with the predictive force profile.

12. The method of claim 10 further comprising:

applying an additional compensatory force to the ground station via the at least one submerged thruster, wherein the additional compensatory force is sufficient to further reduce the amplitude of the oscillation profile, wherein the additional compensatory force varies over time in a periodic manner.

13. The method of claim 12 further comprising:

determining a predictive force profile based at least in part on the oscillation profile, wherein the predictive force profile comprises (i) a varying compensatory force as a function of time, and (ii) a varying additional compensatory force as a function of time, and wherein applying the compensatory force and the additional compensatory force to the ground station comprises applying the compensatory force and the additional compensatory force in accordance with the predictive force profile.

14. An airborne wind turbine (AWT) system comprising:

an aerial vehicle;

a floating ground station; and a control system configured to:

(i) determine an oscillation profile of the floating ground station, wherein the oscillation profile comprises a period of oscillation and an amplitude, wherein the ground station is coupled to the aerial vehicle, and (ii) direct the application of a compensatory force to the ground station sufficient to reduce the amplitude of the oscillation profile, wherein the compensatory force varies over time in a periodic manner.

15. The system of claim 14, wherein the control system directs the aerial vehicle to apply the compensatory force to the ground station.

16. The system of claim 15, wherein the aerial vehicle is coupled to the ground station via a tether, and wherein the control system directs the aerial vehicle to apply the compensatory force to the ground station, and wherein the compensatory forces acts through the tether.

17. The system of claim 14, wherein the ground station comprises at least one submerged thruster, and wherein the control system directs the at least one submerged thruster to apply the compensatory force to the ground station.

18. The system of claim 14, wherein the aerial vehicle is coupled to the ground station via a tether, wherein the ground station comprises at least one submerged thruster, and wherein the control system directs the aerial vehicle and the at least one submerged thruster, in combination, to apply the compensatory force to the ground station.

19. The system of claim 14, wherein the ground station comprises at least one submerged thruster, wherein the control system is further configured to:

determine an oscillation direction of the ground station, and direct the at least one submerged thruster to rotate the ground station until a direction of thrust from the at least one thruster is aligned with the oscillation direction.

20. The system of claim 14, wherein the control system is further configured to:

determine a predictive force profile based at least in part on the oscillation profile, wherein the predictive force profile comprises a varying compensatory force as a function of time, and direct the application of the compensatory force to the ground station in accordance with the predictive force profile.

\* \* \* \* \*